US008661812B2

(12) United States Patent
Ganzel

(10) Patent No.: US 8,661,812 B2
(45) Date of Patent: Mar. 4, 2014

(54) HYDRAULIC BRAKE SYSTEM WITH CONTROLLED BOOST

(75) Inventor: Blaise Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 913 days.

(21) Appl. No.: 12/816,010

(22) Filed: Jun. 15, 2010

(65) Prior Publication Data

US 2011/0185723 A1 Aug. 4, 2011

(51) Int. Cl.
*B60T 8/44* (2006.01)

(52) U.S. Cl.
USPC .......................................... 60/554; 303/114.1

(58) Field of Classification Search
USPC ................... 60/552, 553, 554; 188/358, 359; 303/114.1
See application file for complete search history.

(56) References Cited

U.S. PATENT DOCUMENTS

| | | |
|---|---|---|
| 2,541,312 A | 2/1951 | Vogel |
| 3,729,235 A | 4/1973 | Bach et al. |
| 3,870,377 A | 3/1975 | Belart et al. |
| 3,927,915 A | 12/1975 | Adachi |
| 3,979,153 A | 9/1976 | Ingram et al. |
| 4,440,454 A | 4/1984 | Belart et al. |
| 4,489,989 A | 12/1984 | Belart et al. |
| 4,604,870 A | 8/1986 | Bach et al. |
| 4,631,924 A | 12/1986 | Lowe |
| 4,664,239 A | 5/1987 | Symes et al. |
| 4,778,224 A | 10/1988 | Leiber |
| 4,794,757 A | 1/1989 | Schlüter |
| 4,799,048 A | 1/1989 | Goshima et al. |
| 4,802,712 A * | 2/1989 | Resch ............................. 60/545 |

(Continued)

FOREIGN PATENT DOCUMENTS

| | | |
|---|---|---|
| CN | 1757551 A | 4/2006 |
| CN | 1966321 A | 5/2007 |

(Continued)

OTHER PUBLICATIONS

International Search Report for International Application No. PCT/US2011/023364 dated Aug. 23, 2011.

(Continued)

*Primary Examiner* — Thomas E Lazo
(74) *Attorney, Agent, or Firm* — MacMillan, Sobanski & Todd, LLC

(57) ABSTRACT

A vehicle brake system includes a brake pedal unit coupled to a vehicle brake pedal. The system includes an input piston connected to operate a pedal simulator during a normal braking mode, and coupled to actuate a pair of output pistons during a manual push through mode. The output pistons are operable to generate brake actuating pressure at first and second outputs of the brake pedal unit. A hydraulic pressure source supplies fluid at a controlled boost pressure. A hydraulic control unit is adapted to be hydraulically connected to the brake pedal unit and the hydraulic pressure source. The hydraulic control unit includes a slip control valve arrangement, and a switching base brake valve arrangement for switching the brake system between the normal braking mode wherein boost pressure from the pressure source is supplied to first and second vehicle brakes, and the manual push through mode wherein brake actuating pressure from the brake pedal unit is supplied to the first and second vehicle brakes. The input piston cooperates with a seal mounted in the brake pedal unit to provide for a progressive rate of friction therebetween as the input piston is advanced in the brake pedal unit by the brake pedal.

19 Claims, 18 Drawing Sheets

(56) References Cited

U.S. PATENT DOCUMENTS

| | | | |
|---|---|---|---|
| 4,831,826 A | 5/1989 | Belart | |
| 4,832,416 A | 5/1989 | Kaes | |
| 4,875,338 A | 10/1989 | Leiber | |
| 4,941,322 A | 7/1990 | Nomura et al. | |
| 4,964,676 A | 10/1990 | Resch | |
| 5,273,349 A | 12/1993 | Kidston | |
| 5,448,888 A | 9/1995 | Castel | |
| 5,941,608 A | 8/1999 | Campau | |
| 5,971,027 A | 10/1999 | Beachley et al. | |
| 5,988,768 A | 11/1999 | Schaefer | |
| 6,058,705 A | 5/2000 | Schunck | |
| 6,086,167 A | 7/2000 | Heckmann | |
| 6,113,197 A | 9/2000 | Kuroki et al. | |
| 6,139,119 A | 10/2000 | Otomo et al. | |
| 6,161,904 A | 12/2000 | Schmidt | |
| 6,183,050 B1 | 2/2001 | Ganzel | |
| 6,206,484 B1 | 3/2001 | Ganzel | |
| 6,216,457 B1 | 4/2001 | Lubbers | |
| 6,227,629 B1 | 5/2001 | Yoshida et al. | |
| 6,733,090 B2 | 5/2004 | Pasterkamp et al. | |
| 6,808,238 B2 | 10/2004 | Drott | |
| 7,823,984 B2 | 11/2010 | Schlüter | |
| 2004/0004394 A1 | 1/2004 | Ganzel | |
| 2005/0162008 A1 | 7/2005 | Bickel et al. | |
| 2007/0114842 A1 | 5/2007 | Ohkubo et al. | |
| 2008/0258546 A1* | 10/2008 | Drumm et al. | 303/115.4 |
| 2009/0077963 A1 | 3/2009 | Ganzel | |
| 2009/0179485 A1 | 7/2009 | Yang | |
| 2010/0164276 A1 | 7/2010 | Schlüter et al. | |

FOREIGN PATENT DOCUMENTS

| | | |
|---|---|---|
| DE | 3715209 A1 | 4/1988 |
| DE | 4028925 A1 | 3/1992 |
| DE | 19546647 A1 | 6/1997 |
| DE | 19651153 A1 | 6/1998 |
| DE | 19654427 | 6/1998 |
| DE | 19734956 C1 | 8/1998 |
| DE | 19807369 A1 | 8/1999 |
| DE | 19826346 A1 | 10/1999 |
| DE | 10116203 A1 | 10/2002 |
| DE | 10159788 A1 | 6/2003 |
| DE | 102005037792 B3 | 5/2007 |
| EP | 1210258 A1 | 6/2002 |
| GB | 2141505 A | 12/1984 |
| GB | 2340194 A | 2/2000 |
| JP | 60209357 A | 10/1985 |
| JP | 04274955 A | 9/1992 |
| KR | 1020090077182 A | 7/2009 |
| WO | 9834821 A1 | 8/1998 |
| WO | 0140038 A1 | 6/2001 |
| WO | 0172567 A1 | 10/2001 |
| WO | 2005108179 A1 | 11/2005 |
| WO | 2007005571 A2 | 1/2007 |
| WO | WO2007005571 A2 | 1/2007 |
| WO | 2009058916 A1 | 5/2009 |

OTHER PUBLICATIONS

International Search Report for PCT/US2005/016179 dated Aug. 31, 2005.

Japanese Office Action for Japanese Patent Application No. 2007-511,705 (English Translation).

Search Report for the People's Republic of China, Application No. 201080006387.1 issued May 28, 2013.

* cited by examiner

HYDRAULIC BRAKE SYSTEM WITH CONTROLLED BOOST

CROSS-REFERENCE TO RELATED APPLICATIONS

This application claims the benefit of International Application No. PCT/US10/023121, filed Feb. 3, 2010.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

SUMMARY OF THE INVENTION

This invention relates to a vehicle brake system which includes a brake pedal unit coupled to a vehicle brake pedal. The system includes an input piston connected to operate a pedal simulator during a normal braking mode, and coupled to actuate a pair of output pistons during a manual push through mode. The output pistons are operable to generate brake actuating pressure at first and second outputs of the brake pedal unit. A hydraulic pressure source supplies fluid at a controlled boost pressure. A hydraulic control unit is adapted to be hydraulically connected to the brake pedal unit and the hydraulic pressure source. The hydraulic control unit includes a slip control valve arrangement, and a switching base brake valve arrangement for switching the brake system between the normal braking mode wherein boost pressure from the pressure source is supplied to first and second vehicle brakes, and the manual push through mode wherein brake actuating pressure from the brake pedal unit is supplied to the first and second vehicle brakes. The input piston cooperates with a seal mounted in the brake pedal unit to provide for a progressive rate of friction therebetween as the input piston is advanced in the brake pedal unit by the brake pedal.

This invention also relates to a vehicle brake system including a brake pedal unit coupled to a vehicle brake pedal. The system includes an input piston connected to operate a pedal simulator during a normal braking mode, and coupled to actuate a pair of output pistons during a manual push through mode. The output pistons are operable to generate brake actuating pressure at first and second outputs of the brake pedal unit. A hydraulic pressure source supplies fluid at a controlled boost pressure. A hydraulic control unit is adapted to be hydraulically connected to the brake pedal unit and the hydraulic pressure source. The hydraulic control unit includes a slip control valve arrangement, and a switching base brake valve arrangement for switching the brake system between the normal braking mode wherein boost pressure from the pressure source is supplied to first and second vehicle brakes, and the manual push through mode wherein brake actuating pressure from the brake pedal unit is supplied to the first and second vehicle brakes. The pedal simulator applies an opposing feedback force to the input piston and brake pedal during brake application. The pedal simulator defines a fluid chamber in communication with a fluid reservoir via a conduit. An orifice is disposed in the conduit to restrict the flow of fluid therethrough such that the orifice cooperates with the input piston to provide progressive damping to impede the advancement of the input piston as the input piston is advanced in the brake pedal unit.

This invention may also relate to a vehicle brake system including a brake pedal unit coupled to a vehicle brake pedal. The brake pedal unit includes an input piston connected to operate a pedal simulator during a normal braking mode, and coupled to actuate a pair of output pistons during a manual push through mode. The output pistons are operable to generate brake actuating pressure at first and second outputs of the brake pedal unit. A hydraulic pressure source supplies fluid at a controlled boost pressure. A hydraulic control unit is adapted to be hydraulically connected to the brake pedal unit and the hydraulic pressure source. The hydraulic control unit includes a slip control valve arrangement, and a switching base brake valve arrangement for switching the brake system between the normal braking mode wherein boost pressure from the pressure source is supplied to first and second vehicle brakes, and the manual push through mode wherein brake actuating pressure from the brake pedal unit is supplied to the first and second vehicle brakes. The brake pedal unit includes a cushion for cushioning the input piston back to a rest position when the brake pedal has not been actuated.

Various aspects of this invention will become apparent to those skilled in the art from the following detailed description of the preferred embodiments, when read in light of the accompanying drawings.

DETAILED DESCRIPTION OF THE PREFERRED EMBODIMENT

Figure 1:
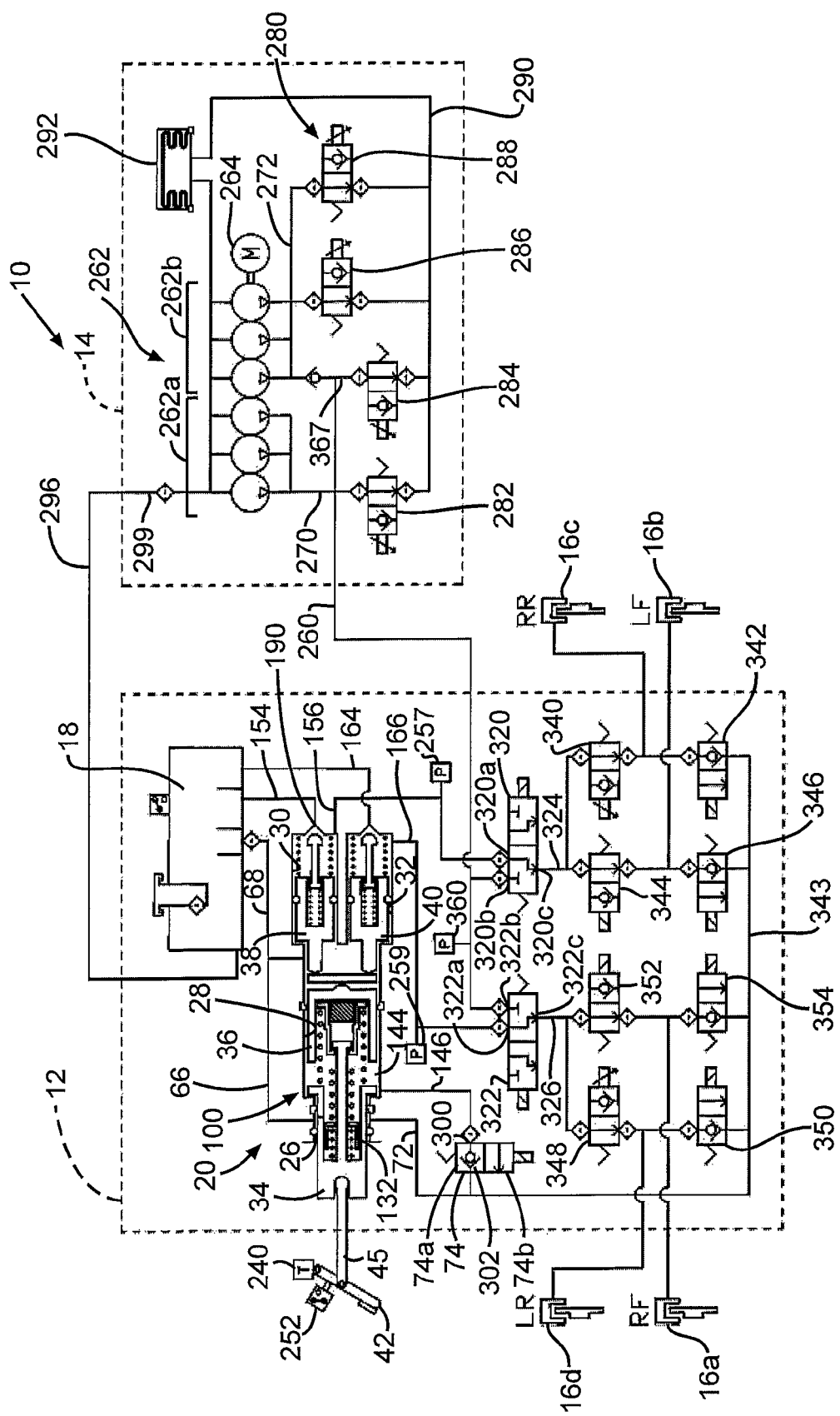
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a hydraulic control unit, indicated by broken lines 12, and a power pack assembly, indicated by broken lines 14. The components of the hydraulic control unit 12 may be housed together in a single unit or block. The components of the power pack assembly 14 may also be housed in a single unit or block. As schematically shown, the power pack assembly 14 is located remotely from the hydraulic control unit 12 and conduits or hydraulic lines hydraulically couple the hydraulic control unit 12 with the power pack assembly 14. Alternatively, the hydraulic control unit 12 and the brake module 14 may be housed in a single unit. It should also be understood that the grouping of components as illustrated in FIG. 1 is not intended to be limiting and any number of components of the hydraulic control unit 12 and the power pack assembly 14 may be housed together or separately.

The hydraulic control unit 12 cooperatively acts with the power pack assembly 14 for actuating wheel brakes 16a, 16b, 16c, and 16d. The wheel brakes 16a, 16b, 16c, and 16d can be any suitable wheel brake structure operated by the application of pressurized brake fluid. The wheel brake 16a, 16b, 16c, and 16d may include, for example, a brake caliper mounted on the vehicle to engage a frictional element (such as a brake disc) that rotates with a vehicle wheel to effect braking of the associated vehicle wheel. The wheel brakes 16a, 16b, 16c, and 16d can be associated with any combination of front and rear wheels of the vehicle in which the brake system 10 is installed. For example, wheel brakes 16a and 16b may be associated with the front wheels and wheel brakes 16c and 16d may be associated with rear wheels. For a diagonally split brake system, the wheel brakes 16a and 16c may be associated with one side of the vehicle, and the wheel brakes 16b and 16c may be associated with the other side of the vehicle.

The hydraulic control unit 12 includes a fluid reservoir 18 for storing and holding hydraulic fluid for the brake system 10. The fluid within the reservoir 18 may be held generally at atmospheric pressure or can store the fluid at other pressures if so desired. The hydraulic control unit 12 also includes a brake pedal unit (BPU), indicated generally at 20. The brake pedal unit 20 is also schematically shown in enlarged detail in FIGS. 2-4. It should be understood that the structural details of the components of the brake pedal unit 20 illustrate only one example of a brake pedal unit 20. The brake pedal unit 20 could be configured differently having different components than that shown in FIGS. 2-4.

The brake pedal unit 20 includes a housing 24 having various bores formed in for slidably receiving various cylindrical pistons and other components therein. In the embodiment illustrated in FIGS. 2-4, the housing 24 is formed from a first portion 24a and a second portion 24b. The first and second portions 24a and 24b may be coupled together by any suitable manner, such as by mounting bolts. Alternatively, the housing 24 may be formed as a single unit or include three or more separately formed portions coupled together. The housing 24 generally includes a first bore 26, a second bore 28, a third bore 30, and a fourth bore 32. The first and second bores 26 and 28 are formed in the first portion 24a of the housing 24 and are axially aligned with one another. The second bore 28 has a larger diameter than the first bore 26. The third and fourth bores 30 and 32 are formed in the second portion 24b and are in communication with the larger diameter second bore 28. The third bore 30 is located laterally (or above when viewing FIGS. 1 and 2) with respect to the fourth bore 32. The use of two housing portions 24a and 24b provides for convenient installation of various components within the bores 26, 28, 30, and 32.

The brake pedal unit 20 further includes an input piston 34, an intermediate piston 36, a first output piston 38, and a second output piston 40. The input piston 34 is slidably disposed in the first bore 26. The intermediate piston 36 is slidably disposed in the second bore 28. The first output piston 38 is slidably disposed in the third bore 30. The second output piston 40 is slidably disposed in the fourth bore 32.

Figure 2:
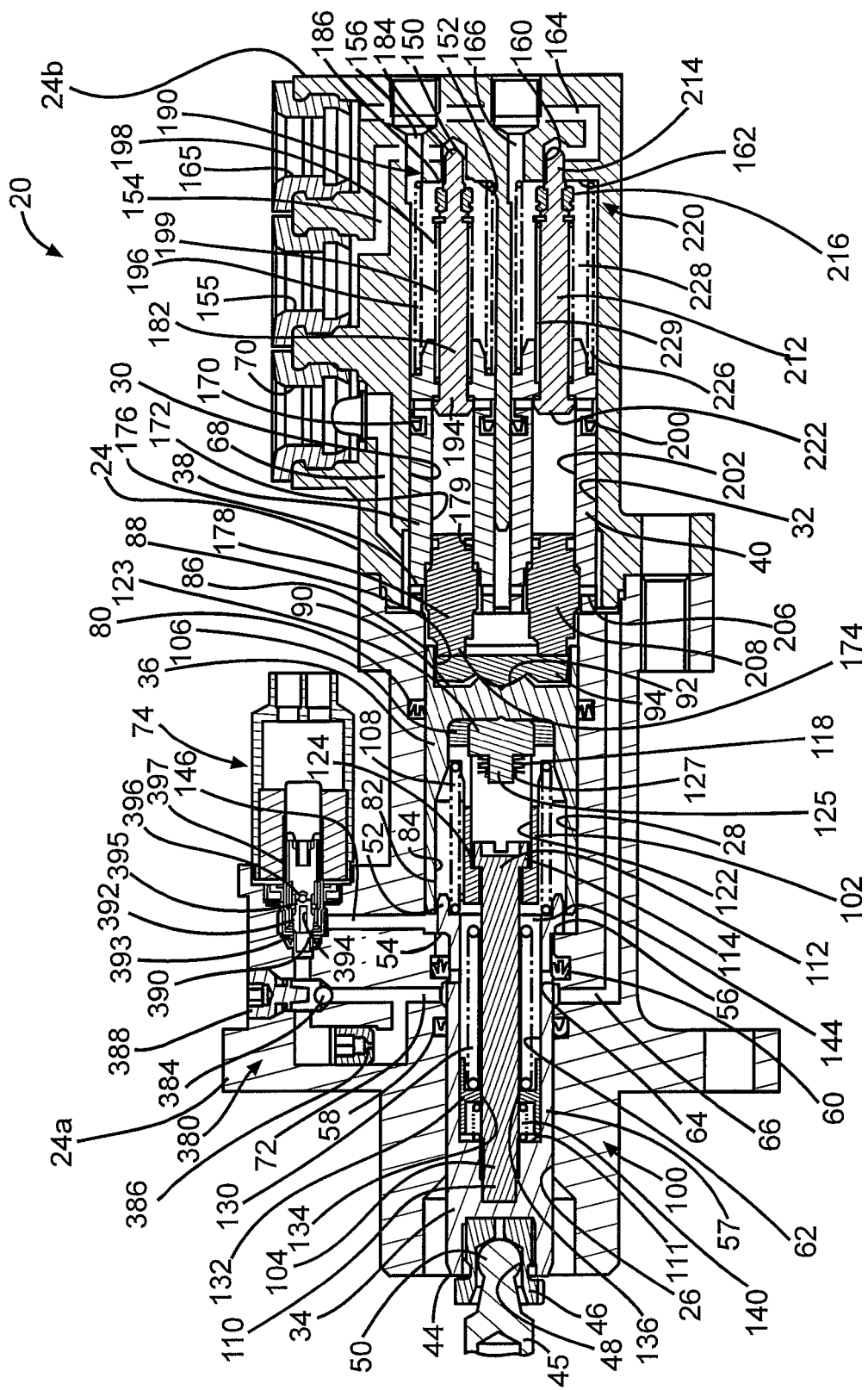
FIG. 2 is an enlarged schematic sectional view of a brake pedal unit of the brake system of FIG. 1 shown in its rest position.
Figure 3:
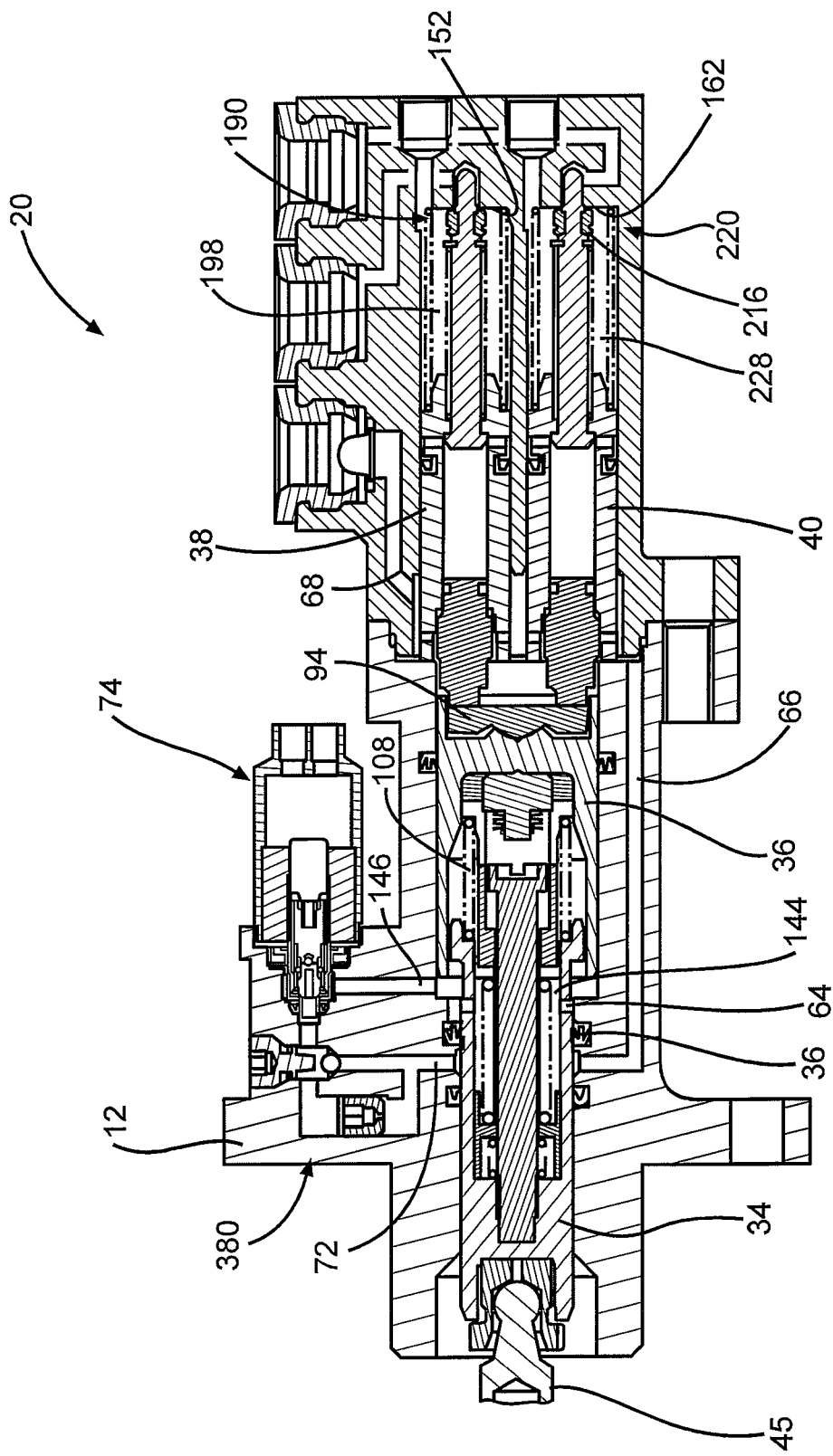
FIG. 3 is an enlarged schematic sectional view of the brake pedal unit of FIG. 2 shown in its boost apply position.
Figure 4:
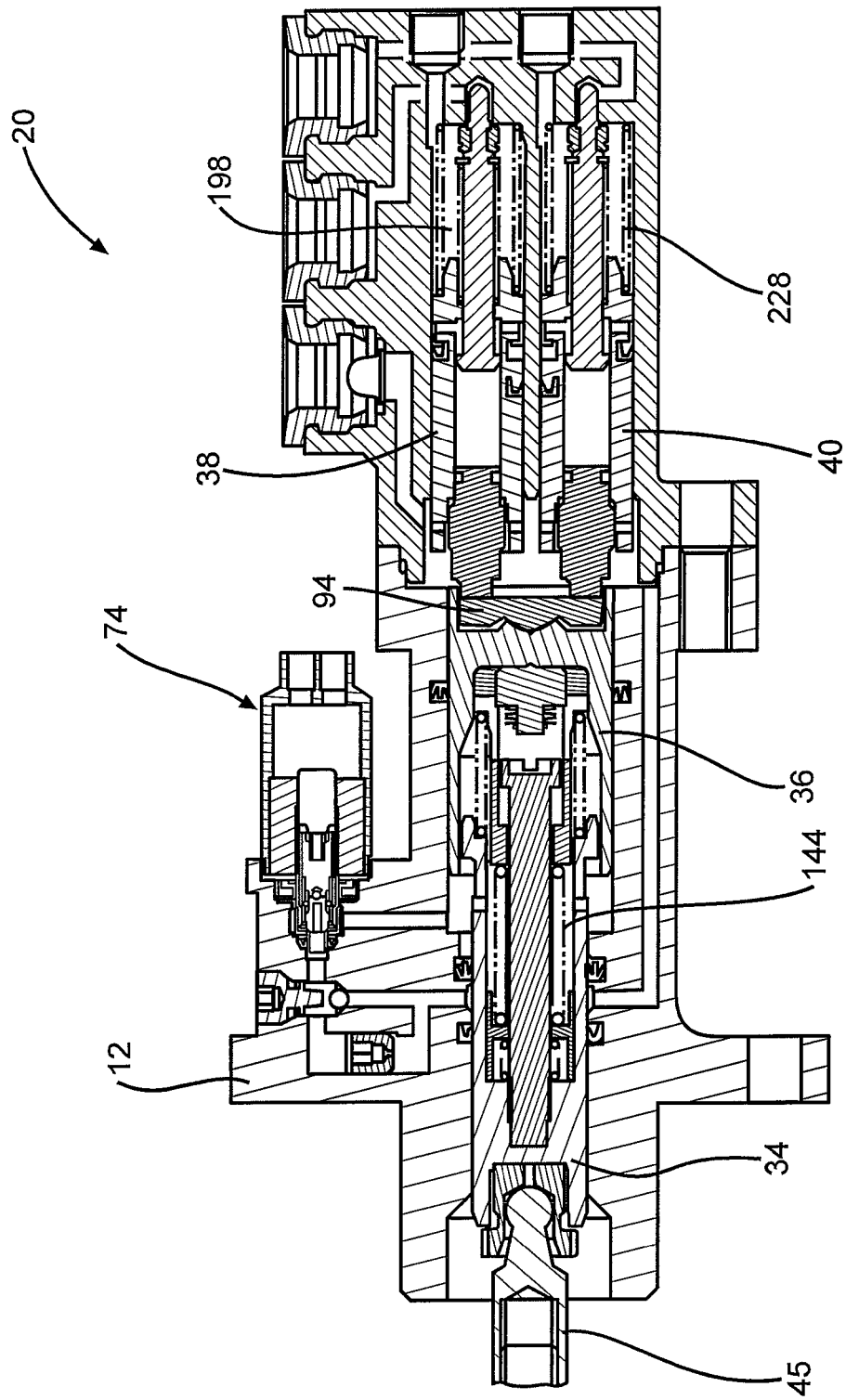
FIG. 4 is an enlarged schematic sectional view of the brake pedal unit of FIG. 2 shown in its manual apply position.

A brake pedal, indicated schematically at 42 in FIG. 1, is coupled to a first end 44 of the input piston 34 via an input rod 45 and a coupler 46. The coupler 46 is threadably engaged with the first end 44 of the input piston 34 and includes a socket 48 for receiving a spherical end 50 of the input rod 44. Alternatively, the input rod 45 could be coupled directly to the input piston 34 without having the coupler 46. The input piston 34 includes an enlarged second end 52 that defines a shoulder 54. In the rest position shown in FIG. 2, the shoulder 54 of the input piston engages with a shoulder 56 formed between the first and second bores 26 and 28 of the housing 24. An outer cylindrical surface 57 of the input piston 34 is engaged with lip seals 58 and 60 mounted in grooves formed in the housing 24. The outer cylindrical surface 57 may be continuous along its length or it may be stepped, as shown in FIG. 2, having two or more different diameter portions. The input piston 34 includes a central bore 62 formed through the second end 52. One or more lateral passageways 64 are formed through the input piston 34. The lateral passageways 64 extend from the outer cylindrical surface to the central bore 62. The brake pedal unit 20 is in a "rest" position as shown in FIGS. 1 and 2. In the "rest" position, the pedal 42 has not been depressed by the driver of the vehicle. In the rest position, the passageways 64 of the input piston 34 are between the lip seals 58 and 60. In this position, the passageways 64 are in fluid communication with a conduit 66 formed though the first portion 24a of the housing 24. The conduit 66 is in fluid communication with a conduit 68 formed in the second portion 24b of the housing 24 which is in fluid communication with a reservoir port 70 connected to the reservoir 18. The conduits 66 and 68 can be formed by various bores, grooves and passageways formed in the first and second portions 24a and 24b of the housing 24. In the rest position, the passageways 64 are also in fluid communication with a conduit 72 formed in the housing 24 which leads to a simulation valve 74 (cut off valve which may be electrically operated). The simulation valve 74 may be mounted in the housing 24, as shown in FIGS. 2-4, or may be remotely located therefrom, as schematically shown in FIG. 1.

The intermediate piston 36 is slidably disposed in the second bore 28 of the housing 24. The outer wall of the intermediate piston 36 is engaged with a lip seal 80 mounted in a groove formed in the housing 24. The intermediate piston 36 includes a first end 82 having a cavity 84 formed therein. A second end 86 of the intermediate piston 36 includes a cavity 88 formed therein. The cavity 88 includes a floor 90 defining a pivot groove 92 which functions as a "rocker-like" or "cam-like" support surface for a wobble plate 94, which will be explained in further detail below.

The central bore 62 of the input piston 34 and the cavity 84 of the intermediate piston 36 house various components defining a pedal simulator, indicated generally at 100. A caged spring assembly, indicated generally at 102, is defined by a pin 104, a retainer 106, and a low rate simulator spring 108. A first end 110 of the pin 104 is press fit, threadably engaged, or otherwise attached to the input piston 34 at a bottom floor portion 111 of the central bore 62. The pin 104 extends axially through the central bore 62 and into the cavity 84 of the intermediate piston 36. A second end 112 of the pin 104 includes a circular flange 114 extending radially outwardly therefrom. A stop 123 is provided which may be integrally formed with the retainer 120 or may be a separate piece attached thereto. The stop 123 is axially aligned with the pin 104. The stop includes a stem 125. A plurality of disc springs 118 (also known as Belleville washers, coned-disc springs, or cupped spring washers) is disposed on the stem 125 and retained thereon by a circlip 127. The disc springs 118 may be in a preloaded state when mounted on the stem 125 or may mounted in a non-loaded state. The retainer 106 of the caged spring assembly 102 includes a stepped through bore 122. The stepped through bore 122 defines a shoulder 124. The second end 112 of the pin 104 extends through the through bore 122. The flange 114 of the pin 104 engages with the shoulder 124 of the retainer 106 to prevent the pin 104 and the retainer 106 from separating from each other. One end of the low rate simulator spring 108 engages with the second end 52 of the input piston 34, and the other end of the low rate simulator spring 108 engages with the retainer 106 to bias the retainer 106 in a direction away from the pin 104.

The pedal simulator 100 further includes a high rate simulator spring 130 which is disposed about the pin 104. The terms low rate and high rate are used for description purposes and are not intended to be limiting. It should be understood that that the various springs of the pedal simulator 100 may have any suitable spring coefficient or spring rate. In the illustrated embodiment, the high rate simulator spring 130 preferably has a higher spring rate than the low rate simulator spring 108. A sleeve 132 is slidably disposed in the central bore 62 of the input piston 34 and includes a through bore 134 through which the pin 104 extends. The through bore 134 defines a radially inwardly extending flange 136. One end of the high rate simulator spring 130 engages with the flange 136. The other end of the high rate simulator spring 130 is shown in FIG. 2 in a non-engaged position and spaced away from an end of the retainer 106. A blend spring 140 is disposed about the pin 104. One end of the blend spring 140 engages with the flange 136 of the sleeve 132, and the other end of the blend spring 140 engages with the bottom floor portion 111 of the central bore 62 of the input piston 34. The housing 24, the input piston 34 (and its seals), and the intermediate piston (and its seals) generally define a simulation chamber 144. The simulation chamber 144 is in fluid communication with a conduit 146 which is in fluid communication with the simulation valve 74.

As discussed above, the brake pedal unit 20 includes the first and second output pistons 38 and 40 that are disposed in third and fourth bores 30 and 32, respectively, which are formed in the second portion 24b of the housing 24. The first and second output pistons 38 and 40 are slidably disposed along parallel axes. These axes are offset but parallel to the axis defined by the input piston 34 and the intermediate piston 36. The third bore 30 includes a reduced diameter portion 150 formed at a bottom floor 152 of the third bore 30. The reduced diameter portion 150 is in fluid communication with the reservoir 18 via a reservoir conduit 154 and port 155. An output conduit 156 is formed in the second portion 24b of the housing 24 and is in fluid communication with the third bore 30 adjacent the bottom floor 152. The output conduit 156 may be extended via external piping or a hose connected to the housing 24. This output conduit 156 is shown schematically in FIG. 1. The fourth bore 32 includes a reduced diameter portion 160 formed at a bottom floor 162 of the fourth bore 32. The reduced diameter portion 160 is in fluid communication with the reservoir 18 via a reservoir conduit 164 and port 165. An output conduit 166 is formed in the second portion 24b of the housing 24 and is in fluid communication with the fourth bore 32 adjacent the bottom floor 162. The output conduit 166 may be extended via external piping or a hose connected to the housing 24. This output conduit 166 is shown schematically in FIG. 1.

The first output piston 38 includes a lip seal 170 disposed in a groove formed on the outer wall of the first output piston 38 and is sealingly engaged with the wall of the third bore 30. The first output piston 38 includes a through bore 172. The end 174 of the first output piston 38 also includes an extension 178 attached thereto. The extension 178 may be threadably attached to first output piston 38 and adjusted for length. Set screws may be positioned in lateral passageways 176 to lock the extension 178 in place. The extension 178 may include a seal 179 for sealing the fluid within the through bore 172. Alternatively, the extension 178 could be formed integrally with the first output piston 38. The extension 178 includes a head portion 180 which engages with an end of the wobble plate 94, the reason for which will be explained below. A pin 182 is slidably disposed in the through bore 172. One end 184 of the pin 182 is disposed in the reduced diameter portion 150 of the third bore 30. Note that end 184 of the pin 182 and/or the reduced diameter portion 150 may be formed with grooves or passageways to provide selective fluid flow between the third bore 30 and the reservoir conduit 154. A compensation seal 186 is disposed at the end 184 of the pin 182 and cooperates with selective sealing against the bottom floor 152 to provide a center valve assembly, indicated generally at 190 (see FIG. 1). The other end 192 of the pin 182 includes an enlarged head portion 194 which prevents the pin 182 from separating from the first output piston 38. An output piston spring 196 is disposed in the third bore 30 and biases the first output piston in a leftward direction, as viewing FIGS. 1 and 2. A first output pressure chamber 198 is defined by the third bore 30, the first output piston 38, the seal 170 and the center valve assembly 190. The first output pressure chamber 198 is in fluid communication with the conduit 156. The first output pressure chamber 198 is also in selective fluid communication with the reservoir conduit 154 via the center valve assembly 190. A secondary spring arrangement 199 may also be used to provide a bias of the compensation seal 186 against the bottom wall 152 and is used to initially get the elastomeric seal 186 to its seating position. Afterwards, pressure within the first output pressure chamber 198 helps keep the seal 186 seated.

The arrangement of the second output piston 40 is similar to the first output piston 38. The second output piston 40 includes a lip seal 200 disposed in a groove formed on the outer wall of the second output piston 40 and is sealingly engaged with the wall of the fourth bore 32. The second output piston 40 includes a through bore 202. The end 204 of the second output piston 40 also includes an extension 208 attached thereto. The extension 208 may be threadably attached to the second output piston 40 and adjusted for length. Set screws may be positioned in lateral passageways 206 to lock the extension 208 in place. The extension 208 may include a seal 209 for sealing the fluid within the through bore 202. Alternatively, the extension 208 could be formed integrally with the second output piston 40. The extension 208 includes a head portion 210 which engages with a second end of the wobble plate 94, the reason for which will be explained below. A pin 212 is slidably disposed in the through bore 202. One end 214 of the pin 212 is disposed in the reduced diameter portion 160 of the fourth bore 32. Note that end 204 of the pin 212 and/or the reduced diameter portion 160 may be formed with grooves or passageways to provide selective fluid flow between the fourth bore 32 and the reservoir conduit 164. A compensation seal 216 is disposed at the end 214 of the pin 212 and cooperates with selective sealing against the bottom floor 162 to provide a center valve assembly, indicated generally at 220. The other end 222 of the pin 212 includes an enlarged head portion 224 which prevents the pin 212 from separating from the second output piston 40. An output piston spring 226 is disposed in the fourth bore 32 and biases the second output piston 40 in a leftward direction, as viewing FIGS. 1 and 2. A second output pressure chamber 228 is defined by the fourth bore 32, the second output piston 40, the seal 200, and the center valve assembly 220. The second output pressure chamber 228 is in fluid communication with the conduit 166. The second output pressure chamber 228 is also in selective fluid communication with the reservoir conduit 164 via the center valve assembly 220. A secondary spring arrangement 229 may also be used to provide a bias of the compensation seal 220 against the bottom wall 162 and is used to initially get the elastomeric seal 220 to its seating position. Afterwards, pressure within the second output pressure chamber 228 helps keep the seal 220 seated.

Referring back to FIG. 1, the system 10 may further include a travel sensor, schematically shown at 240 in FIG. 1, for producing a signal that is indicative of the length of travel of the input piston 34. The system 10 may also include a switch 252 for producing a signal for actuation of a brake light and to provide a signal indicative of movement of the input piston 34. The brake system 10 may further include sensors such as pressure transducers 257 and 259 for monitoring the pressure in the conduits 164 and 166.

As discussed above, the power pack assembly 14 may be located remotely from the hydraulic control unit 12. As will be discussed below, the power pack assembly 14 generally provides a controlled source of fluid pressure (or boosted pressure) to the hydraulic control unit 12 via a boost conduit 260. The power pack assembly 14 includes a pump assembly 262 driven by one or more motors 264. The pump assembly 262 can be any pump assembly capable of delivering the desired pressure levels. For example, the pump assembly 262 can be a single piston pump run by a single motor. In the embodiment of the pump assembly 262 schematically shown in FIG. 1, the pump assembly 262 includes six pistons. The pump assembly 262 may be configured into a pair of three piston sub-assemblies 262a and 262b, having either one or two motors 264 connected thereto. The three pistons may be offset by about 120 degrees from one another. The pump assembly 262 includes pump output conduits 270 and 272 which are connected to a boost valve assembly, indicated generally at 280. The boost valve assembly 280 can be configured as any boost valve mechanism capable of providing fluid to the boost conduit 260 at a desired pressure flow and pressure level. The boost valve assembly 280 may include a single boost valve or may include multiple independently controlled valves. In the embodiment illustrated in FIG. 1, the boost valve assembly 280 includes first, second, third, and fourth boost valves 282, 284, 286, and 288, respectively. The boost valves 282, 284, 286, and 288 may be proportionally controlled solenoid valves. The boost valves 282, 284, 286, and 288 also are fluidly connected to a conduit 290. The conduit 290 is in fluid communication with an optional reservoir 292 (or referred to as an accumulator). The conduit 290 and the reservoir 292 are in fluid communication with the reservoir 18 via a reservoir conduit 296. The reservoir 292 stores fluid at a relatively low pressure and may be included in the system 10 to assist in providing a source of fluid for the inlet of the pump assembly 262. Under certain circumstances, such as during low temperatures, it may be desirable to provide a source of fluid at a relatively short distance from the inlet of the pump assembly 262 compared to drawing fluid from the reservoir 18 which may located a relatively far distance away. The power pack assembly 14 may also include a filter 299 in the conduit 296.

As stated above, the hydraulic control unit 12 includes a simulation valve 74 which may be mounted in the housing 24, as shown in FIGS. 2-4. As schematically shown in FIG. 1, the simulation valve 74 may be a solenoid actuated valve. The simulation valve 74 includes a first port 300 and a second port 302. The port 300 is in fluid communication with the conduit 146 which is in fluid communication with the simulation chamber 144. The port 302 is in fluid communication with the conduit 72 which is in fluid communication with the reservoir 18 via the conduits 66 and 68. The simulation valve 74 is movable between a first position 74a restricting the flow of fluid from the simulation chamber 144 to the reservoir 18, and a second position 74b permitting the flow of fluid between the reservoir 18 and the simulation chamber 144.

The system 10 further includes a first base brake valve 320 and a second base brake valve 322 (also referred to as switching valves or switching valve arrangement). The base brake valves 320 and 322 may be solenoid actuated three way valves. The base brake valves 320 and 322 are generally operable to two positions, as schematically shown in FIG. 1. The first base brake valve 320 has a port 320a in fluid communication with the conduit 156 which is in fluid communication with the first output pressure chamber 198. A port 320b is in fluid communication with the boost conduit 260. A port 320c is in fluid communication with a conduit 324 which is selectively in fluid communication with the wheel brakes 16b and 16c. The second base brake valve 322 has a port 322a in fluid communication with the conduit 166 which is in fluid communication with the second output pressure chamber 228. A port 322b is in fluid communication with the boost conduit 260. A port 322c is in fluid communication with a conduit 326 which is selectively in fluid communication with the wheel brakes 16a and 16d.

The system 10 further includes various valves (slip control valve arrangement) for permitting controlled braking operations, such as ABS, traction control, vehicle stability control, and regenerative braking blending. A first set of valves include an apply valve 340 and a dump valve 342 in fluid communication with the conduit 324 for cooperatively supplying brake fluid received from the boost valve assembly 280 to the wheel brake 16c, and for cooperatively relieving pressurized brake fluid from the wheel brake 16c to a reservoir conduit 343 in fluid communication with the reservoir conduit 72. A second set of valves include an apply valve 344 and a dump valve 346 in fluid communication with the conduit 324 for cooperatively supplying brake fluid received from the boost valve assembly 280 to the wheel brake 16b, and for cooperatively relieving pressurized brake fluid from the wheel brake 16b to the reservoir conduit 343. A third set of valves include an apply valve 348 and a dump valve 350 in fluid communication with the conduit 326 for cooperatively supplying brake fluid received from the boost valve assembly 280 to the wheel brake 16d, and for cooperatively relieving pressurized brake fluid from the wheel brake 16d to the reservoir conduit 343. A fourth set of valves include an apply valve 352 and a dump valve 354 in fluid communication with the conduit 326 for cooperatively supplying brake fluid received from the boost valve assembly 280 to the wheel brake 16a, and for cooperatively relieving pressurized brake fluid from the wheel brake 16a to the reservoir conduit 343.

The following is a description of the operation of the brake system 10. FIGS. 1 and 2 illustrate the brake system 10 and the brake pedal unit 20 in the rest position. In this condition, the driver is not depressing the brake pedal 42. Also in the condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module can include a microprocessor. The control module receives various signals, processes signals, and controls the operation of various electrical components of the brake system 10 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 10 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations the pump assembly 262 and the boost valve assembly 280 are usually operated to provide boost pressure to the boost conduit 260 for actuation of the wheel brakes 16a-d. The boost conduit 260 provides pressurized fluid to the conduits 324 and 326 via the energized base brake valves 320 and 322. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). The control module actuates the boost valves 282, 284, 286, and 288 to provide a desired boost pressure level and fluid flow to the boost conduit 260. The control module may control the boost valves 282, 284, 286, and 288 in various different ways to provide the desired pressure level at the boost conduit 260. The boost valves 282, 284, 286, and 288 are selectively actuated to divert fluid from the pump outlet conduits 270 and 272, and selectively actuated to divert fluid to the reservoir conduit 290 to obtain the desired fluid flow and pressure level in the boost conduit 260. Ideally, the boost valves 282, 284, 286, and 288 are actuated to provide a relatively quiet operation of the components of the power pack assembly 14 and in an energy efficient manner. Although four boost valves are shown, it should be understood that the boost valves may be replaced with just a pair of proportionally controlled valves. Thus, use of two pairs of boost valves 282, 284, 286, and 288 may be desirable such that smaller less inexpensive valves can be used. A pressure transducer 360 may be connected to the boost conduit 260 to provide a signal for the control module indicative of the pressure level within the conduit 260. The pressure transducer 360 may be located in either of the hydraulic control unit 12 or the power pack assembly 14.

During a normal boost apply braking operation, such as is shown in FIG. 3, the flow of pressurized fluid from the brake pedal unit 20 generated by depression of the brake pedal 42 is diverted into the pedal simulator assembly 100. The simulation valve 74 is actuated to divert fluid through the simulation valve 74 from the simulation chamber 144 to the reservoir 18 via the conduits 146, 72, 66, and 68. Note that fluid flow from the simulation chamber 144 to the reservoir 18 is closed off once the passageways 64 move past the seal 60. Prior to movement of the input piston 34, as shown in FIG. 2, the simulation chamber 144 is in fluid communication with the reservoir 18 via the conduits 66 and 68.

The base brake valves 320 and 322 are energized to a secondary position to prevent the flow of fluid from the conduits 156 and 166 through the valves 320 and 322. Fluid flow is prevented from flowing from the ports 320a and 322a to the ports 320c and 322c, respectively. Thus, the fluid within the first and second output pressure chambers 198 and 228 are fluidly locked which generally prevents the first and second output pistons 38 and 40 from moving further. More specifically, during the initial stage of the normal boost apply braking operation, movement of the input rod 45 causes movement of the input piston 34 in a rightward direction, as viewing FIG. 2. Initial movement of the input piston 34 causes movement of the intermediate piston 36 via the low rate simulator spring 108. Movement of the intermediate piston 36 causes initial movement of the first and second output pistons 38 and 40 via the wobble plate 94. The wobble plate 94 is free to pivot in a relatively small amount to help equalize pressures within the first and second output chambers 198 and 228. The first and second output pistons 38 and 40 move until their center valve assemblies 190 and 220 close. More specifically, the center valve assemblies 190 and 220 close when the seals 186 and 216 seal against the floors 152 and 162, respectively.

Figure 5:
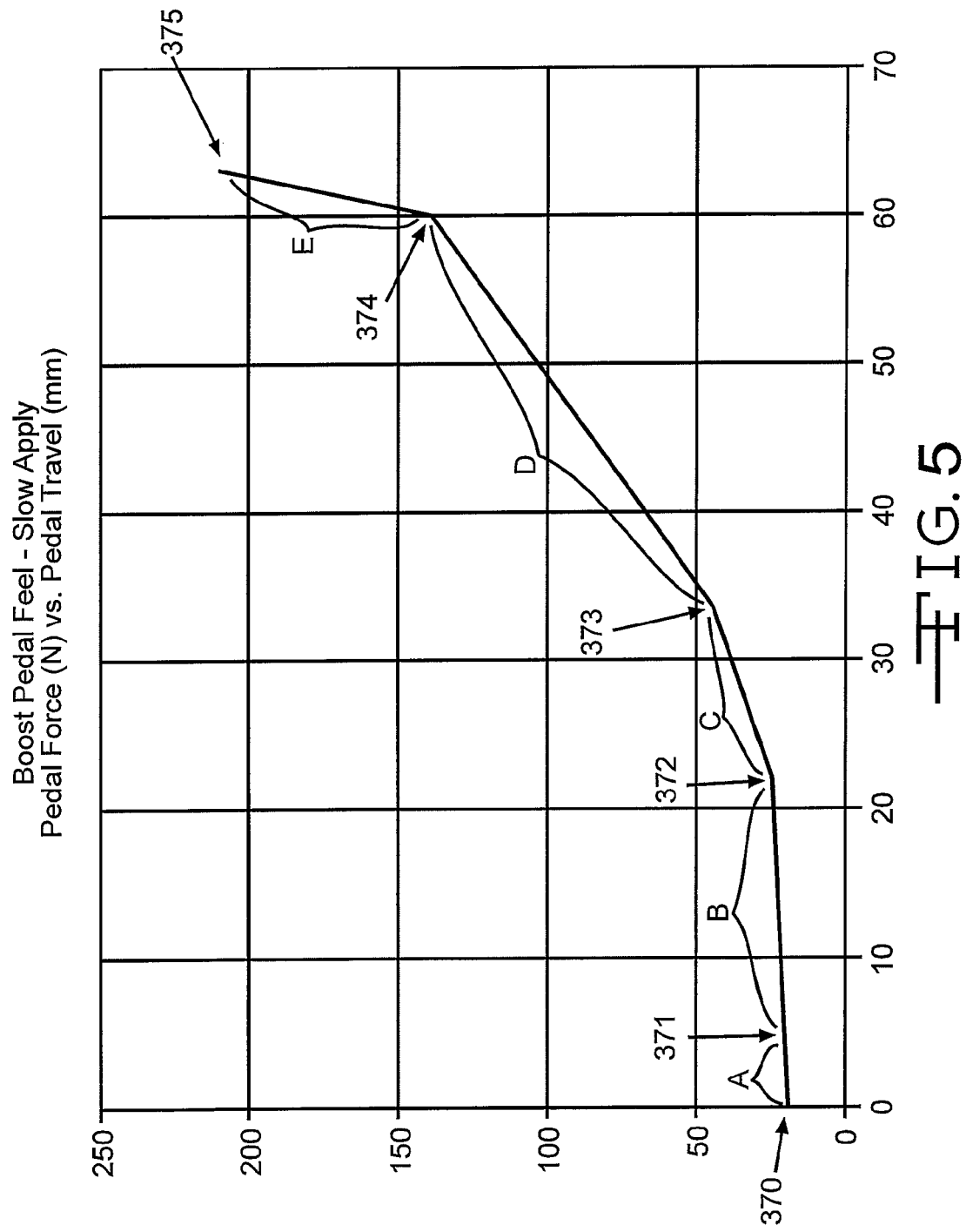
FIG. 5 is a graphical representation of a possible pedal force and simulation pressure vs. pedal travel for the brake system of FIG. 1.

After the center valve assemblies 190 and 220 have closed, the input piston 34 continues to move rightward, as viewing FIG. 2, upon further movement by the driver depressing the brake pedal 42. Further movement of the brake pedal 42 by the driver will cause the input piston 34 to move rightward, as viewing FIG. 2, compressing the various springs of the pedal simulator assembly 100, thereby providing a feedback force to the driver of the vehicle. The description of the operation of the pedal simulator 100 will be described with respect to the graph of FIG. 5, wherein the line represents the pedal force vs. pedal travel for an embodiment of invention, such as illustrated in FIGS. 1-4. The pedal force corresponds to the feedback force the driver feels at their foot. It should be understood that the numerical data is not meant to be limiting to the invention and describes only one possible embodiment of the invention. The force of about 20 Newtons prior to travel corresponds to a knee point 370 which corresponds to the preload of the springs and various seals such as those associated with the output pistons 38 and 40. The region A generally corresponds to the travel until the center valve assemblies 190 and 220 close off, at about 4 or 5 mm of travel, as indicated by the knee point 371. At this point, the output springs 196 and 226 generally stop compressing. If desired, the various springs of the pedal simulator 100 and the output springs could be configured such that the knee point 371 point between region A and B is not detectable by the driver. During the region B of FIG. 5, the input piston 34 will continue moving compressing the low rate simulator spring 108 until the right-hand end of the high rate simulator spring 130 contacts the retainer 106 corresponding to the knee point 372. Further movement causes the high rate simulator spring 130 and the blend spring 140 to compress corresponding to the region C. The blend spring 140 will continue to compress until the sleeve 132 contacts the bottom floor portion 111 of the central bore 62 of the input piston 34 which corresponds to the knee point 373. Further movement, now corresponding to region D, will compress the high rate simulator spring 130 and the low rate simulator spring 108 until the disc springs 118 contact the end 112 of the pin 104 at a knee point 374. Further movement, now corresponding to region E, will also compress the disc springs 118 as well as the high rate simulator spring 130 and the low rate simulator spring 108. Further movement will cause the stem 125 of the stop 123 to come into direct contact with the end 112 of the pin 104. At this point, the input piston 34 is in a "hard" engagement with the intermediate piston 36 via the pin 104 such that there is no further compression of the springs 108, 130, and 118. The springs may be configured such that they may or may not be fully compressed at this time. In an alternate embodiment, the disc springs 118 could be replaced with an elastomeric spring element, such as by replacing the rigid stop 123 with an elastomeric spring element. The end of the pin 104 (which may be reconfigured) would then compress the elastomeric spring element.

During operation of the power pack 14, the pistons of the pump assembly 262 may all be supplying fluid to the conduits 270 and 272. For circumstances when a lower fluid pressure rate is desired, the pump assembly 262 could be operated in an energy saving mode to reduce the electrical consumption of the motor 264. In this mode, the pump sub-assembly 262a provides an output pressure to the conduit 260, but the other pump sub-assembly 262b does not. A check valve 367 may be provided to prevent fluid flow from the outlet of the pump sub-assembly 262a via the conduit In the event of a loss of electrical power to portions of the brake system 10, the brake system 10 provides for manual push through or manual apply, such as is shown in FIG. 4. During an electrical failure, the motor 264 might cease to operate, thereby failing to produce pressurized hydraulic brake fluid from the pump assembly 262. Furthermore, the boost valve assembly 280 might return to a de-energized position if energized. In this situation, the power pack assembly 14 does not supply the desired pressurized fluid within the boost conduit 260. The base brake valves 320 and 322 will shuttle to the positions shown in FIG. 1 closing off fluid flow from the boost conduit 260 to the conduits 324 and 326. In these positions, the base brake valves 320 and 322 permit fluid flow from the conduits 156 and 166 (via the ports 320a and 322a) to the conduits 324 and 326 (via the ports 320c and 322c), respectively. Thus, the brake pedal unit 20 may now provide manual apply for energizing the fluid conduits 324 and 326 for actuation of the wheel brakes 16a-d. The simulation valve 74 is shuttled to its position as shown in FIG. 1 to prevent fluid from flowing out of the simulation chamber 144 to the reservoir 18, thereby hydraulically locking the simulation chamber 144. During manual apply as shown in FIG. 4, the first and second output pistons 38 and 40 will advance rightward pressurizing the chambers 198 and 228. Fluid flows from the chambers 198 and 228 into the conduits 324 and 326, respectively, to actuate the wheel brakes 16a-d. Note that the fluid within the simulation chamber 144 is trapped or locked and movement of the input piston 34 will cause movement of the intermediate piston 36 which causes movement of the first and second output pistons 38 and 40 via the wobble plate 94. Due to differences in hydraulic effective areas of the input and intermediate pistons 34 and 36, the input piston 34 may travel more axially than the intermediate piston 36. Although a reduced diameter effective area of the input piston 34 compared to the larger diameter effective area of the intermediate piston 36 requires further travel, the force input by the driver's foot is reduced.

In another example of a failed condition of the brake system 10, the power pack assembly 14 may fail as discussed above and furthermore one of the output pressure chambers 198 and 228 may be reduced to zero or reservoir pressure, such as failure of a seal. The wobble plate 94 will accordingly pivot on one side until it bottoms out against the floor 90. However, since the wobble plate 94 and its corresponding pivot groove 92 are configured such that the wobble plate 94 cannot pivot by a large amount, the driver will not feel much of a pedal drop when one of the circuits fails. In this manual push through situation, the pressure within the other non-failed output pressure chamber 198 or 228 will be at about twice the pressure.

As stated above with respect to FIG. 1, the simulation valve 74 may be a solenoid actuated valve movable between a first position 74a restricting the flow of fluid from the simulation chamber 144 to the reservoir 18, and a second position 74b permitting the flow of fluid between the reservoir 18 and the simulation chamber 144. In the embodiment illustrated in FIGS. 2-4, the simulation valve 74 operates in cooperation with an optional check valve assembly 380 located in the conduit 72. The assembly 380 includes a ball 384 and seat 385 which is in a parallel arrangement with a restricted orifice 386. The assembly 380 may be retained in the housing 24 by a retainer 388. During a spike apply in which the driver presses on the brake pedal 42 in a rapid and forceful manner, the damping orifice 386 restricts the flow of fluid through the conduit 72 from the simulation chamber 144, thereby impeding advancement of the input piston 34. This may be a desirable characteristic of the brake system 10 as compared to a system in which the fluid can rapidly flow out of the simulation chamber 144. The size of the damping orifice can be sized accordingly. Note that the one way check valve assembly 380 provides for bypass flow path in the direction from the reservoir 18 to the simulation valve 74, thereby bypassing the damping orifice 386. The function of the damping orifice 386 and the check valves assembly 380 may be integrally provided in the simulation valve 74 instead of being separate components.

The simulation valve 74 may be configured as a simple digital open/close valve arrangement, as indicated schematically at 74 in FIG. 1. Alternatively, the simulation valve 74 may be configured as a dual stage valve (two stage valve), as is shown in the embodiment shown in FIGS. 2-4. In this embodiment, the simulation valve 74 includes a first sealing assembly 390 defined by a slidably disposed poppet 392 which engages with a seat 393. The poppet 392 includes a relatively large bore 394 formed therethrough and includes a restricted orifice 395 on one end. A second sealing assembly 396 is situated at the restricted orifice 395 and includes a ball seat arrangement mounted on an armature 397. Note that the orifice 386 may be larger than the orifice 395 within the simulation valve 74.

During normal braking, the simulation valve 74 is actuated such that the armature 397 moves rightward, as shown in FIG. 3, opening the first sealing assembly 90 and the second sealing assembly 396 to permit the flow of fluid from the conduit 146 through the simulation valve 74 and into the conduit 72 in a generally unrestricted manner. The inclusion of the dual stage simulation valve 74 provides for a reduced pedal drop experienced by the driver under certain situations. For example, if the driver were to depress the brake pedal 42 when the vehicle was not turned on, i.e., no electrical power being supplied to the system 10, the system 10 enters into a manual apply mode, as shown in FIG. 4. In this situation, the simulation valve 74 is de-energized, thereby closing the simulation valve and trapping the fluid within the simulation chamber 144. The driver is able to advance the input piston 34, the intermediate piston 36, and the output pistons 38 and 40 as described above. Note that the pressure within the simulation chamber 144 increases the more the driver advances the input piston 34 via the brake pedal 42 due in part because of reactionary forces from the wheel brakes 16a-d. If the driver then turns on the ignition while still applying pressure to the brake pedal 42, the simulation valve 74 can be energized with enough current to open the second sealing assembly 396 but not the first sealing assembly 390. Thus, the poppet 392 remains on the seat 393 due to a pressure build up within the simulation valve 74. Pressurized fluid from the simulation chamber 144 is then diverted through the restricted orifice 395 of the simulation valve 74. This restriction impedes the flow of fluid such that the input piston 34 will not suddenly or rapidly advance towards the intermediate piston 36 due the continuing force applied by the driver.

Figure 6:
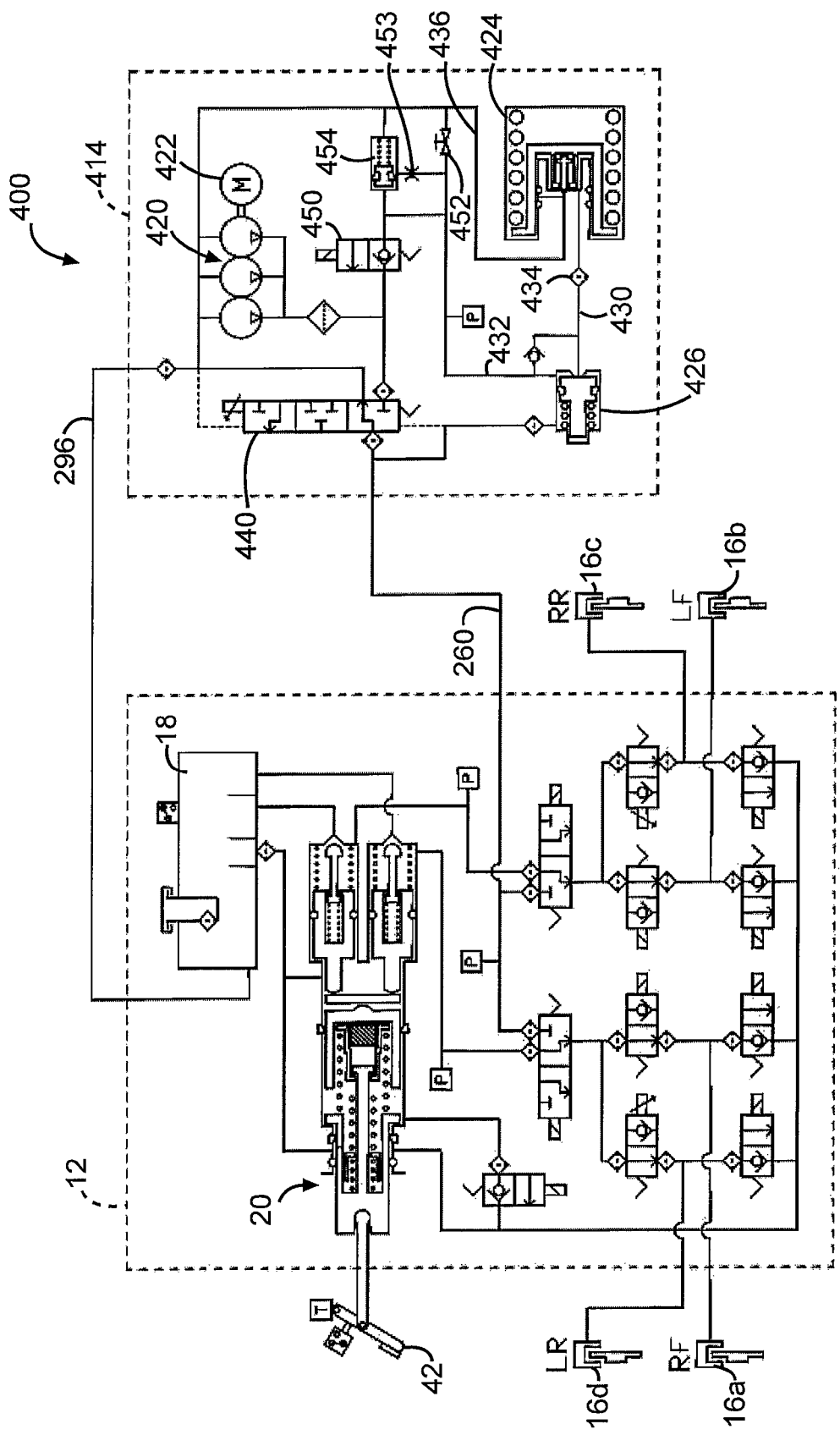
FIG. 6 is a schematic illustration of a second embodiment of a brake system.

There is illustrated in FIG. 6 a second embodiment of a vehicle brake system indicated generally at 400. Similar to the above described brake system 10, the brake system 400 may suitably be used on a ground vehicle such as an automotive vehicle having four wheels and a wheel brake for each wheel. Furthermore, the brake system 400 can be provided with other braking functions such as anti-lock braking (ABS), other slip control features, and regenerative braking blending to effectively brake the vehicle. The brake system 400 is similar in function and structure of some aspects of the brake system 10 and, therefore, like numbers and or names may be used to reference similar components.

The brake system 400 generally includes a hydraulic control unit which may be the same hydraulic control unit 12 as described above with respect to FIGS. 1-5. One of the differences between the systems 10 and 400 is that the brake system 400 uses a different power pack assembly 414. The power pack assembly 414 provides a source of pressurized fluid for the system 400 via a boost conduit 260.

The power pack assembly 414 includes a pump assembly 420 driven by a motor 422. The pump assembly 420 may have any configuration, such as a three piston configuration schematically illustrated in FIG. 6. The power pack assembly 414 further includes a medium pressure accumulator (MPA) 424 and a medium pressure accumulator (MPA) priority valve 426. The reservoir conduit 296 provides hydraulic braking fluid from the reservoir 18 to the pump assembly 420. In one embodiment, the motor 422 is a flux switching brushless motor that self monitors its torque output. The MPA 424 is in selective fluid communication with the outlet of the pump assembly 420 and the MPA priority valve 426 via fluid conduits 430 and 432. The conduit 430 may include a filter 434.

The MPA 424 may be a piston style accumulator including an internal piston biased by a spring. Such a medium pressure accumulator is disclosed and described in PCT Patent Publication No. WO 2009/058916, which is incorporated by reference herein. A chamber is defined by the piston and wall portions of a housing of the MPA 424. The spring biases the piston in a direction to reduce the volume of the chamber, thereby pressurizing the chamber and the fluid conduit 430. The MPA 424 is preferably an accumulator that is capable of storing pressurized fluid to a predetermined pressure (operating pressure). Although the MPA 424 is referred to as a "medium" pressure accumulator as opposed to a "high" pressure accumulator used in conventional brake systems, the MPA 424 may be configured to store pressurized fluid at any desired pressure levels. The MPA 424 preferably includes a bypass function that dumps fluid to the reservoir 18 via a conduit 436 and the reservoir conduit 296 when the pressure within the MPA 424 exceeds a predetermined threshold value. The pressurized fluid in the MPA 424 is utilized to supply pressurized fluid to a boost valve 440 for braking demands that the vehicle encounters during a normal course of driving. This is opposed to emergency braking in which demand for fluid pressure at the boost valve 440 requires a relatively high amount of pressurized brake fluid (pressure exceeding the bypass pressure of the MPA 424) wherein the pump assembly 420 provides for the demanded higher pressure levels.

In operation, the brake pedal unit 12 of the system 400 operates in a similar manner as the system 10. During operation in a boost apply state, pressurized brake fluid from the pump assembly 420 and/or the MPA 424 of the system 400 is supplied to the electro-hydraulic boost valve 440. The boost valve 440 may be a proportional pressure control spool valve or a proportional flow control spool valve that at times may maintain pressure in the fluid conduit 432 to allow pressurized brake fluid to flow from the discharge of the pump assembly 420 and/or to the MPA 424 for pressurizing the MPA 424 with pressurized brake fluid. The boost valve 440 further allows the flow of pressurized brake fluid via the boost conduit 260 for actuating the wheel brakes 16a-d in a similar manner as described above with respect to the system 10.

The MPA priority valve 426 is disposed between the pump assembly 420 and the MPA 424. The MPA priority valve 426 controls the supply of pressurized brake fluid from the pump assembly 420 to the MPA 424 for charging the MPA 424. The MPA priority valve 426 is a pilot operated valve referencing the boost pressure in the boost conduit 260 and the pressure exiting the pump assembly 420. For high demand braking operations in which the pressure required from the boost valve 440 exceeds, for example a pressure slightly higher than the predetermined pressure, which is above the bypass pressure of the MPA 424, the MPA priority valve 426 will actuate between open, closed, and metering positions to provide sufficient pressure from the pump assembly 420 in excess of the boost pressure demanded in the conduit 260.

A normally closed (N/C) MPA valve 450 is disposed in the conduit 432. The N/C MPA valve 450 may be a two-position digital isolation valve operable between a fully open position and a fully closed position. The N/C MPA valve 450 may be current limited depending on the pressure and flow rates acting on the valve. This provides the advantage of conserving energy for maintaining the N/C closed valve 450 in an open position when maximum current is not required to do so.

When in a closed position, the N/C MPA valve 450 prevents leakage across the boost valve 440 when the boost valve 670 is in an unactuated state. This allows the boost valve 440 to be manufactured with lower tolerances which reduces the cost of the boost valve 440. Conventionally, spool valves used in boost valves are typically machined to high tolerances to minimize leakage through the boost valve when closed. With the inclusion of the N/C MPA valve 450, the system 400 may include a lower cost boost valve 440. For example, when the boost valve 440 is in an unactuated position, the boost valve 440 isolates the pressurized fluid generated by the pressure source from the boost conduit 260. Leakage of fluid through the spool valve of the boost valve 440 when the boost valve 440 is in an unactuated state results in a loss of pressure in the MPA 424. The pump assembly 420 would thereafter intermittently operate to maintain the pressure in the MPA 424 which ultimately consumes energy as used by the motor. When the N/C MPA valve 450 is in a closed position, the boost valve 440 is isolated from the pressure exerted by the MPA 424 which could otherwise result in leakage. As a result, the boost valve 440 may be manufactured at lower tolerances which ultimately reduces the cost of the boost valve 440 and greatly minimizes energy consumption since the motor 422 will not have to operate as often to fill the depleting MPA 424.

The power pack 414 of the system 400 may also include various components for assisting in evacuation and filing the brake system 400 with fluid, such as for example a restricted orifice 453 and a valve 454. The system may further include a valve 452 for manually depleting the MPA 424 if there is no power to the system 400.

Figure 7:
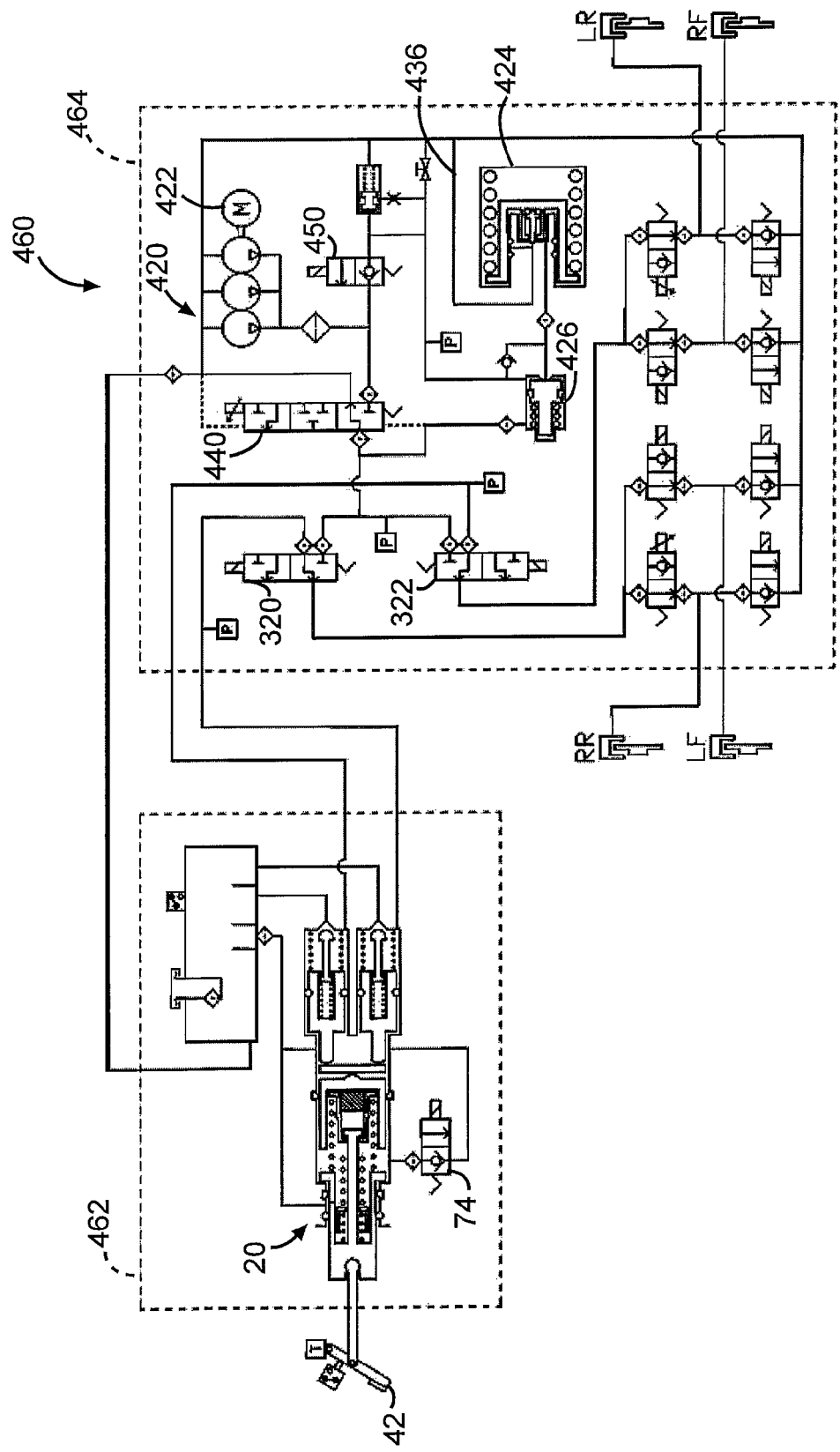
FIG. 7 is a schematic illustration of a third embodiment of a brake system.

There is illustrated in FIG. 7 a third embodiment of a vehicle brake system indicated generally at 460. Similar to the above described brake systems 10 and 400, the brake system 460 may suitably be used on a ground vehicle such as an automotive vehicle having four wheels and a wheel brake for each wheel. Furthermore, the brake system 460 can be provided with other braking functions such as anti-lock braking (ABS), other slip control features and regenerative brake blending to effectively brake the vehicle. The brake system 460 is similar in function and structure to the brake system 400 (and the brake system 10) and, therefore, like numbers and or names may be used to reference similar components.

The brake system 460 generally includes the same components as the brake system 400 illustrated in FIG. 6, but packages the components differently. In the brake system 460, a hydraulic control unit 462 includes the brake pressure unit 20, the reservoir 18, and the simulation valve 74. The remainder of the components may be housed in a common block 464. This arrangement may provide packaging advantages over the brake system 400 in which the space available at the brake pedal unit 20 mounting location is limited. Another advantage is that the brake system 460 may need only one electronic control unit.

Figure 8:
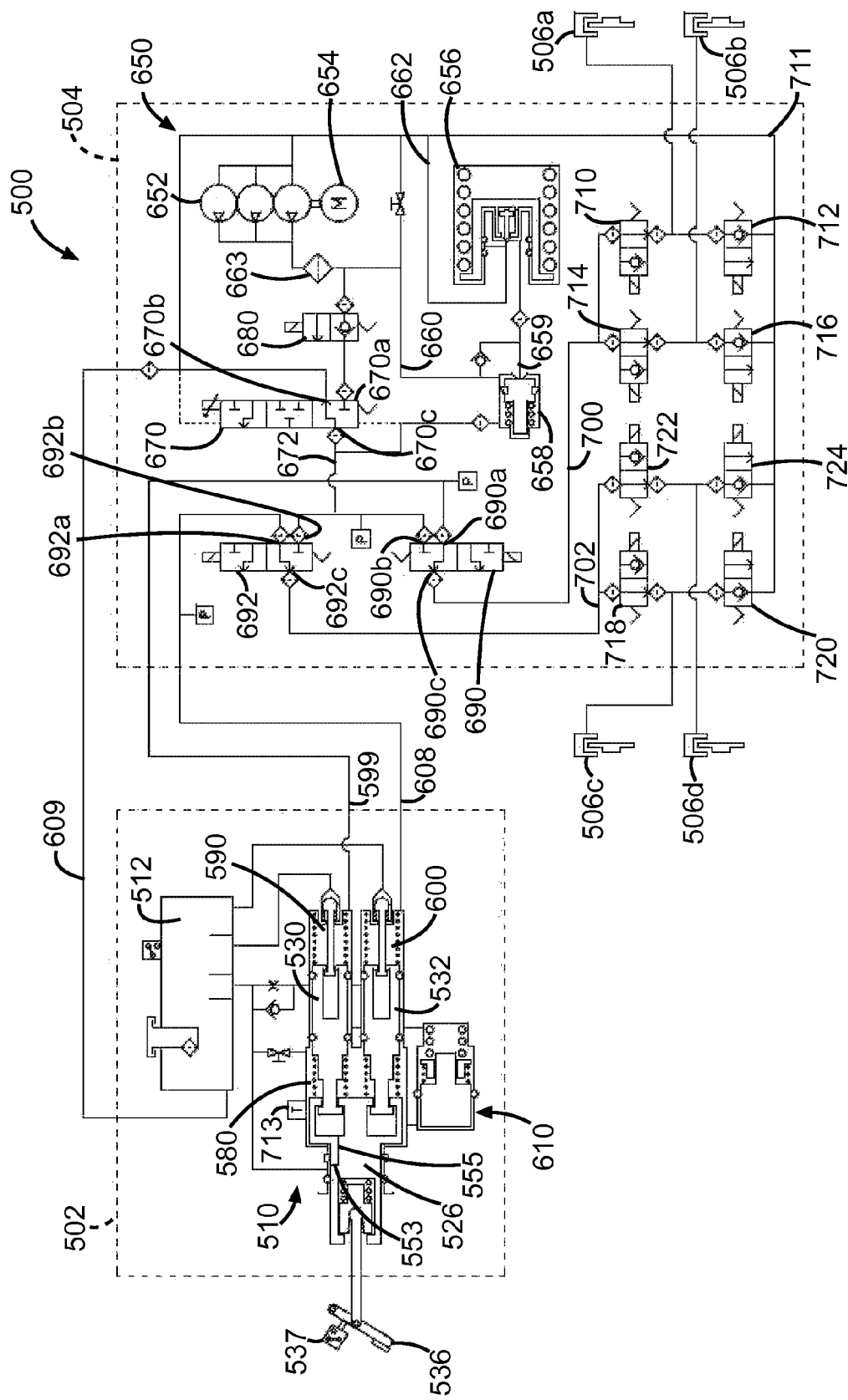
FIG. 8 is a schematic illustration of a fourth embodiment of a brake system.

There is illustrated in FIG. 8 an alternate embodiment of a vehicle brake system indicated generally at 500. Similar to the above described brake systems, the brake system 500 may suitably be used on a ground vehicle such as an automotive vehicle having four wheels and a wheel brake for each wheel. Furthermore, the brake system 500 can be provided with other braking functions to effectively brake the vehicle.

Figure 9:
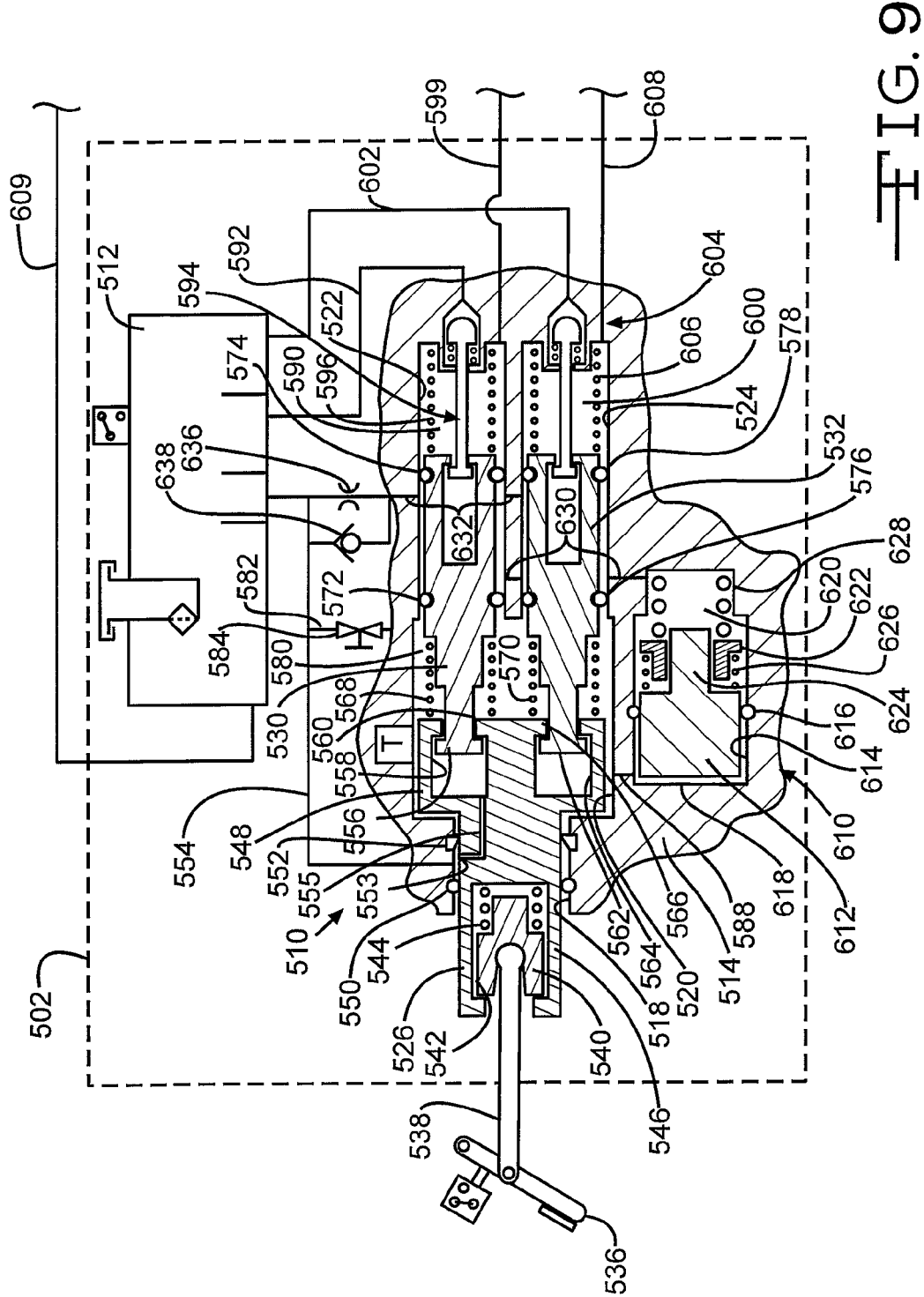
FIG. 9 is an enlarged schematic sectional view of a master cylinder assembly of the brake system of FIG. 8 shown in its rest position.

The brake system 500 includes a master cylinder assembly, indicated generally at 502 in FIG. 8, which is also shown enlarged in FIG. 9. The brake system 500 further includes a brake module, indicated generally at 504 in FIG. 8. The components of the brake module 504 may be housed in one or more hydraulic control blocks and may be located remotely from the master cylinder assembly 502. Conduits or hydraulic lines may hydraulically couple the master cylinder assembly 502 and the brake module 504.

The master cylinder assembly 504 cooperatively acts with the brake module 504 for actuating wheel brakes 506a, 506b, 506c, and 506d. The wheel brakes 506a, 506b, 506c, and 506d can be associated with any combination of front and rear wheels of the vehicle in which the brake system 500 is installed. For example, wheel brakes 506a and 506b may be associated with the front wheels and wheel brakes 506c and 506d may be associated with rear wheels. Alternatively, for a diagonally split brake system, the wheel brakes 506a and 506c may be associated with the front wheels and the wheel brakes 506b and 506d may be associated with the rear wheels. Each of the wheel brakes 506a, 506b, 506c, and 506d may be a conventional brake operated by the application of pressurized brake fluid. The wheel brake may be, for example, a brake caliper mounted on the vehicle to engage a frictional element (such as a brake disc) that rotates with a vehicle wheel to effect braking of the associated vehicle wheel.

As schematically shown in FIG. 9, the master cylinder assembly 502 includes a master cylinder 510 in fluid communication with a reservoir 512. The reservoir 512 generally holds hydraulic fluid at atmospheric pressure. The master cylinder 510 includes a housing 514 having various bores formed therein for slidably receiving various cylindrical pistons therein. The master cylinder housing 514 may be formed as a single unit or two or more separately formed portions coupled together. The master cylinder 510 generally includes a first bore 518, a second bore 520, a third bore 522, and a fourth bore 524. The first and second bores 518 and 520 are axially aligned with one another. The third and fourth bores 522 and 524 are in communication with the larger diameter second bore 520. The third bore 522 is located above the fourth bore 522 as viewing FIG. 12. As will be discussed below, a primary piston 526 is slidably disposed in the first and second bores 518 and 520. A first output piston 530 is slidably disposed in the third bore 522. A second output piston 532 is slidably disposed in the fourth bore 524.

A brake pedal 536 is coupled to a first end of a primary piston 526 of the master cylinder 510 via an input rod 538 and a retainer 540. The retainer 540 is disposed in a bore 542 formed in the primary piston 526 and is biased by a spring 544. The system 500 may further include a travel sensor 713 for producing a signal that is indicative of the length of travel of the input rod 538 and/or the length of travel of the primary piston 526. For example, a magnet may be mounted on the primary piston 526, the position of which is detectable by the travel sensor 713. The travel sensor may alternatively be connected to the input rod 538 as describe above. The system 500 may also include a switch 537 for producing a signal for actuation of a brake light and to provide a signal indicative of movement of the input piston 34.

The primary piston 526 includes a first portion 546 slidably disposed in the first bore 518, and a second portion 548 slidably disposed in the second bore 520. The outer wall of the first portion 546 is sealingly engaged with seals 550 and 552 mounted in grooves formed in the housing at the first bore 518. A conduit 554 is in fluid communication with the first bore 518 between the seals 550 and 552. The other end of the conduit 554 connects to the reservoir 512.

As viewing FIGS. 8 and 9, the left-hand end of the first output piston 530 includes an enlarged head 556 which is retained in a slot 558 formed in the second portion 548 of the primary piston 526. The primary piston 526 includes a shoulder 560 formed adjacent the slot 558. The enlarged head 556 is retained in the slot 558 and is prevented from moving in a rightward direction relative to the primary piston 526 by the shoulder 560 when the pistons 526 and 530 are positioned as shown in FIG. 9. Similarly, the left-hand end of the second output piston 532 includes an enlarged head 562 which is retained in a slot 564 formed in the second portion 548 of the primary piston 526. The primary piston 526 includes a shoulder 566 formed adjacent the slot 564. The enlarged head 562 is retained in the slot 564 and is prevented from moving in a rightward direction relative to the primary piston 526 by the shoulder 560 when the pistons 526 and 532 are positioned as shown in FIG. 9. A spring 568 biases the first output piston away from the primary piston 526. A spring 570 biases the second output piston away from the primary piston 526.

The first output piston 530 includes seals 572 and 574 for sealingly engaging with the walls of the third bore 522. The second output piston 532 includes seals 576 and 578 for sealingly engaging with the walls of the fourth bore 524. In general terms, a primary chamber 580 is defined by the second bore 520 between the seal 552 of the primary piston and the seals 572 and 576 of the first and second output pistons 530 and 532. However, the primary chamber 580 is also defined by the bores 518, 522, 524, the primary piston 526, the first and output pistons 530 and 532. The primary chamber 580 is in fluid communication with the reservoir 512 via a conduit 582. A normally closed service bleed screw 584 may be used for selectively opening the conduit 582 such as during service bleeding of the brake system 500. The primary chamber 580 is also in fluid communication with a pedal simulator assembly 610 via a conduit 588, as will be discussed below.

A first output chamber 590 is generally defined by the third bore 522, the seal 574 and the right-hand end of the first output piston 530, as viewing FIG. 9. The first output chamber 590 is in fluid communication with the reservoir 512 via a conduit 592. A poppet style compensation port valve assembly 594 mounted on the end of the first output piston 530 selectively closes off fluid communication between the first output chamber 590 and the conduit 592 when the first output piston 530 moves a sufficient distance in the rightward direction as viewing FIG. 9. A return spring 596 biases the first output piston 530 leftward towards the primary piston 526. The first output chamber 590 is in fluid communication with a conduit 599 in fluid communication with the brake module 504.

Similarly, a second output chamber 600 is generally defined by the fourth bore 524, the seal 578 and the right-hand end of the second output piston 532, as viewing FIG. 9. The second output chamber 600 is in fluid communication with the reservoir 512 via a conduit 602. A poppet style compensation port valve assembly 604 mounted on the end of the second output piston 532 selectively closes off fluid communication between the second output chamber 600 and the conduit 602 when the second output piston 532 moves a sufficient distance in the rightward direction as viewing FIG. 12. A return spring 606 biases the second output piston 532 leftward towards the primary piston 526. The second output chamber 600 is in fluid communication with a conduit 608 in fluid communication with the brake module 504. The reservoir 512 is in fluid communication with the brake module 504 via a reservoir conduit 609.

The pedal simulator assembly 610 may be mounted in the housing 514, as shown in FIG. 9, or may be located remotely. The pedal simulator assembly 610 includes a piston 612 slidably disposed in a bore 614 of the housing 514. A seal 616 engaged between the piston 612 and the wall of the bore 614 generally separates the bore 614 into a pressure chamber 618 and a reservoir chamber 620. The pedal simulator assembly 610 further includes a collar 622 slidingly disposed on a stem 624 of the piston 612. A collar spring 626 biases the collar 622 away from the main portion of the piston 612. A return spring 628 biases the collar 622 and the piston 612, via the collar spring 626, in the left-hand direction as viewing FIG. 9. The return spring 628 preferably has a higher spring rate than the collar spring 626.

The pressure chamber 618 of the pedal simulator 610 is in fluid communication with the primary chamber 580 via the conduit 588. The reservoir chamber 620 of the pedal simulator 610 is in selective fluid communication with the reservoir 512 via a conduit 630. As shown in FIG. 9, the conduit 630 is in fluid communication with the third bore 522 between the seals 572 and 574 of the first output piston 530. The conduit 630 is also in fluid communication with the fourth bore 524 between the seals 576 and 578 of the second output piston 532. A conduit 632 is in fluid communication with the third bore 522 between the seals 572 and 574 of the first output piston 530. The conduit 632 is also in fluid communication with the fourth bore 524 between the seals 576 and 578 of the second output piston 532. The conduit 632 is in fluid communication with the reservoir 512 via the conduit 554. A reduced area orifice 636 may be within the conduit 632 for limiting the flow of fluid through the conduit 632. A check valve 638 may be disposed in parallel with the conduit around the orifice to permit a relative large flow of fluid in a direction from the reservoir 512 to the conduit 632.

Referring to FIG. 8, the brake module 504 may be located remotely from the master cylinder assembly 502. Many of the components of the brake module 504 are similar in function as the components of the systems described above. The brake module 504 includes a pressure source, indicated generally at 650. The pressure source 650 provides a source of pressurized hydraulic fluid to the system 500. The pressure source 650 generally includes a pump 652 driven by a motor 654, a medium pressure accumulator (MPA) 656, and a medium pressure accumulator (MPA) pilot valve 658. The pump 652, the motor 654, the MPA 656, and the MPA pilot valve 658 may all function in a similar manner and have the same structure as those corresponding components discussed above. The reservoir conduit 609 provides hydraulic braking fluid from the reservoir 512 to the pump 652. The pump 652 may be a three-piston style pump driven by an eccentric and oriented 120 degrees from one another. In one embodiment, the motor 654 is a flux switching brushless motor that self monitors its torque output. The MPA 656 is in selective fluid communication with the outlet of the pump 652 and the MPA pilot valve 658 via fluid conduits 659 and 660. The conduit 660 may include a filter 663.

The MPA 656 may have any suitable structure capable of storing fluid to a predetermined pressure. The MPA 656 may be a piston style accumulator including an internal piston biased by a spring. A chamber is defined by the piston and wall portions of a housing of the MPA 656. The spring biases the piston in a direction to reduce the volume of the chamber, thereby pressurizing the chamber and the fluid conduit 659. Although the MPA 656 is referred to as a "medium" pressure accumulator as opposed to a "high" pressure accumulator used in conventional brake systems, the MPA 656 may be configured to store pressurized fluid at any desired pressure levels. The MPA 656 preferably includes a bypass function that dumps fluid to the reservoir 512 via a conduit 662 and the reservoir conduit 609 when the pressure within the MPA 656 exceeds a predetermined threshold value. The pressurized fluid in the MPA 656 is utilized to supply pressurized fluid to a boost valve 670 for braking demands that the vehicle encounters during a normal course of driving. This is opposed to emergency braking in which demand for fluid pressure at the boost valve 670 requires a relatively high amount of pressurized brake fluid (pressure exceeding the bypass pressure of the MPA 656) wherein the fluid pump 652 provides for the demanded higher pressure levels.

In operation, pressurized brake fluid from the pump 652 and/or the MPA 656 is supplied to the electro-hydraulic boost valve 670. The boost valve 670 may be a variable flow spool valve that at times may maintain pressure in the fluid conduit 660 to allow pressurized brake fluid to flow from the discharge of the pump 652 the MPA 656 for pressurizing the MPA 656 with pressurized brake fluid. The boost valve 670 further allows the flow of pressurized brake fluid via a boost conduit 672 for actuating the wheel brakes 506a-d.

The MPA pilot valve 658 is disposed between the pump 652 and the MPA 656. The MPA pilot valve 658 controls the supply of pressurized brake fluid from the pump 652 to the MPA 656. The MPA pilot valve 658 is a pilot operated valve referencing the boost pressure in the boost conduit 672 and the pressure exiting the pump 652. During normal braking operations in which the fluid pressure from the pump 652 and the MPA 656 are below a predetermined pressure, the MPA pilot valve 658 will be in an open position permitting fluid communication between the pump 652 and the MPA 656. For high demand braking operations in which the pressure required from the boost valve 670 exceeds, for example a pressure slightly higher than the predetermined pressure, which is above the bypass pressure of the MPA 656, the MPA pilot valve 658 will actuate between open, closed, and metering positions to provide sufficient pressure from the pump 652 in excess of the boost pressure demanded in the circuit 672.

A normally closed (N/C) MPA valve 680 is disposed between a port 670a of the boost valve and the conduit 660 from the pressure source 650. The N/C MPA valve 680 may be a two-position digital isolation valve operable between a fully open position and a fully closed position. The N/C MPA valve 680 may be current limited depending on the pressure and flow rates acting on the valve. This provides the advantage of conserving energy for maintaining the N/C closed valve 680 in an open position when maximum current is not required to do so.

When in a closed position, the N/C MPA valve 680 prevents leakage across the boost valve 670 when the boost valve 670 is in an unactuated state. This allows the boost valve 670 to be manufactured with lower tolerances which reduces the cost of the boost valve 670. Conventionally, spool valves used in boost valves are typically machined to high tolerances to minimize leakage through the boost valve when closed. With the inclusion of the N/C MPA valve 670, the system 500 may include a lower cost boost valve 670. For example, when the boost valve 670 is in an unactuated position, the boost valve 670 isolates the pressurized fluid generated by the pressure source from the boost conduit 672. Leakage of fluid through the spool valve of the boost valve 670 when the boost valve 670 is in an unactuated state results in a loss of pressure in the MPA 656. The pump 180 would thereafter intermittently operate to maintain the pressure in the MPA 656 which ultimately consumes energy as used by the motor. When the N/C MPA valve 680 is in a closed position, the boost valve 670 is isolated from the pressure exerted by the MPA 656 and the pump 652 which could otherwise result in leakage. As a result, the boost valve 670 may be manufactured at lower tolerances which ultimately reduces the cost of the boost valve 670 and greatly minimizes energy consumption since the motor 654 will not have to operate as often to fill the depleting MPA 656.

The system 500 further includes a first base brake valve 690 and a second base brake valve 692. The base brake valves 690 and 692 may be solenoid actuated three way valves. The first base brake valve 690 has a port 690a in fluid communication with the conduit 599 which is in fluid communication with the first output chamber 590. A port 690b is in fluid communication with the boost conduit 672. A port 690c is in fluid communication with a conduit 700 which is selectively in fluid communication with the wheel brakes 506a and 506b. The second base brake valve 692 has a port 692a in fluid communication with the conduit 608 which is in fluid communication with the second output chamber 600. A port 692b is in fluid communication with the boost conduit 672. A port 690c is in fluid communication with a conduit 702 which is selectively in fluid communication with the wheel brakes 506c and 506d.

The system 500 further includes various valves for permitting controlled braking operations, such as ABS, traction control, vehicle stability control, and regenerative brake blending. A first set of valves include an apply valve 710 and a dump valve 712 in fluid communication with the conduit 700 for cooperatively supplying brake fluid received from the boost valve 670 to the first wheel brake 506a, and for cooperatively relieving pressurized brake fluid from the first wheel brake 506a to a reservoir conduit 711 in fluid communication with the reservoir conduit 609. A second set of valves include an apply valve 714 and a dump valve 716 in fluid communication with the conduit 700 for cooperatively supplying brake fluid received from the boost valve 670 to the second wheel brake 506b, and for cooperatively relieving pressurized brake fluid from the second wheel brake 506b to the reservoir conduit 711. A third set of valves include an apply valve 718 and a dump valve 720 in fluid communication with the conduit 702 for cooperatively supplying brake fluid received from the boost valve 670 to the third wheel brake 506c, and for cooperatively relieving pressurized brake fluid from the third wheel brake 506c to the reservoir conduit 711. A fourth set of valves include an apply valve 722 and a dump valve 724 in fluid communication with the conduit 702 for cooperatively supplying brake fluid received from the boost valve 670 to the fourth wheel brake 506d, and for cooperatively relieving pressurized brake fluid from the fourth wheel brake 506d to the reservoir conduit 711.

Figure 10:
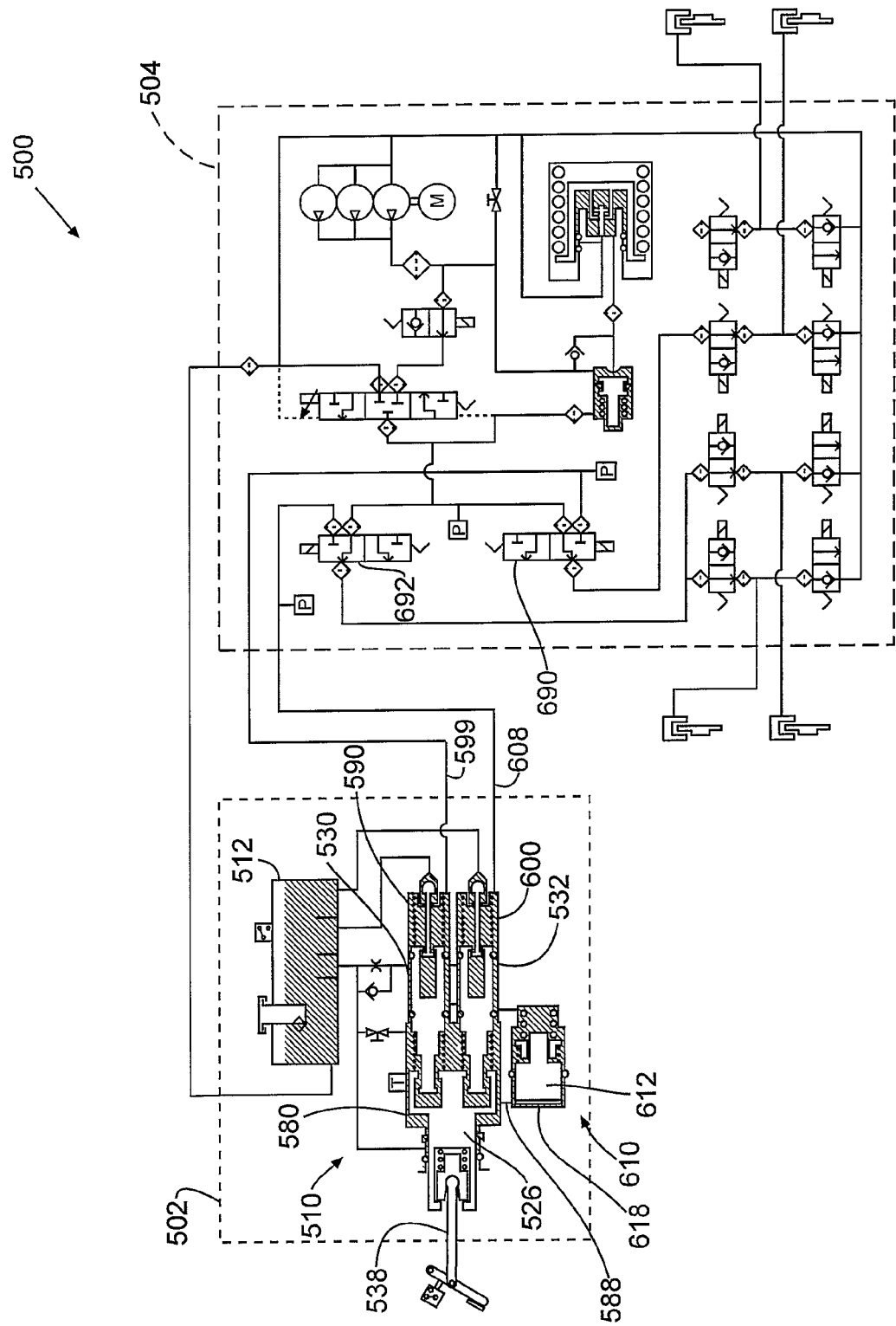
FIG. 10 is a schematic illustration of the brake system of FIG. 8 shown in a normal boost apply position.

The following is a description of the operation of the braking system 500. FIG. 10 illustrates the brake system 500 during a normal boost apply operation (a typical braking condition). During boost apply, the brake pedal 536 is depressed by the driver of the vehicle. The brake pedal 536 is coupled to a travel sensor 713 for producing a signal that is indicative of the length of travel of the primary piston 526 and providing the signal to a control module (not shown). The control module receives various signals, processes signals, and controls the operation of various components of the brake system 500 in response to the received signals. During normal braking operations the pressure source 650 and the boost valve 670 are operated to provide boost pressure within the conduit 672 for actuation of the wheel brakes 506a-d. The conduit 672 provides pressurized fluid to the conduits 700 and 702 via the energized base brake valves 690 and 692. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending).

During a normal boosted braking operation, the flow of pressurized fluid from the master cylinder 510 generated by depression of the brake pedal is diverted into the pedal simulator 610. The base brake valves 690 and 692 are energized to their positions as shown in FIG. 10 to prevent the flow of fluid from the conduits 599 and 608 through the valves 690 and 692. More specifically, movement of the input rod 538 causes the primary piston 526 to move to the right, as viewing FIGS. 9 and 10. Pressure is built up in the primary chamber 580 and fluid flows into the pressure chamber 618 of the pedal simulator assembly 610 via the conduit 588. The pressure chamber 618 expands upon continuing movement of the brake pedal and the primary piston 526. Initial movement of the primary piton 526 causes rightward movement of the first and second output pistons 530 and 532 via the force transmitted through springs 568 and 570. The first and second output pistons 530 and 532 will move a relatively small distance until the compensation assemblies 594 and 604 closes off the fluid communication between the pressure chambers 590 and 600 to the reservoir 512. Further movement of the primary piston 526 will not cause movement of the first and second output pistons 530 and 532 due to the hydraulic lock in the conduits 599 and 608 from the closing of the base brake valves 690 and 692. Note that fluid flow from the primary chamber 580 to the reservoir 512 is closed off once a port 553 moves past the seal 552. Thus, the seal 552 may function as a cut-off valve. Prior to movement of the primary piston 526, the primary chamber 580 is in fluid communication with the reservoir 512 via a conduit 555 and the port 553.

Initial rightward movement of the piston 612 of the pedal simulator 610, as viewing FIG. 10, compresses the spring 626 until the collar 622 rests against the piston 612. Note that the spring 628, which has a higher spring rate than the spring 626, may also slightly compress. Continued movement of the piston 612 compresses the spring 628. Thus, the pedal force in the initial stages generally corresponds to the spring rate of the spring 626 and the spring 628 in series. Once the collar 622 rests against the piston 612, the pedal force generally corresponds to the spring rate of the spring 628. Note that the pedal force is also dependent upon other springs within the master cylinder 510.

Figure 11:
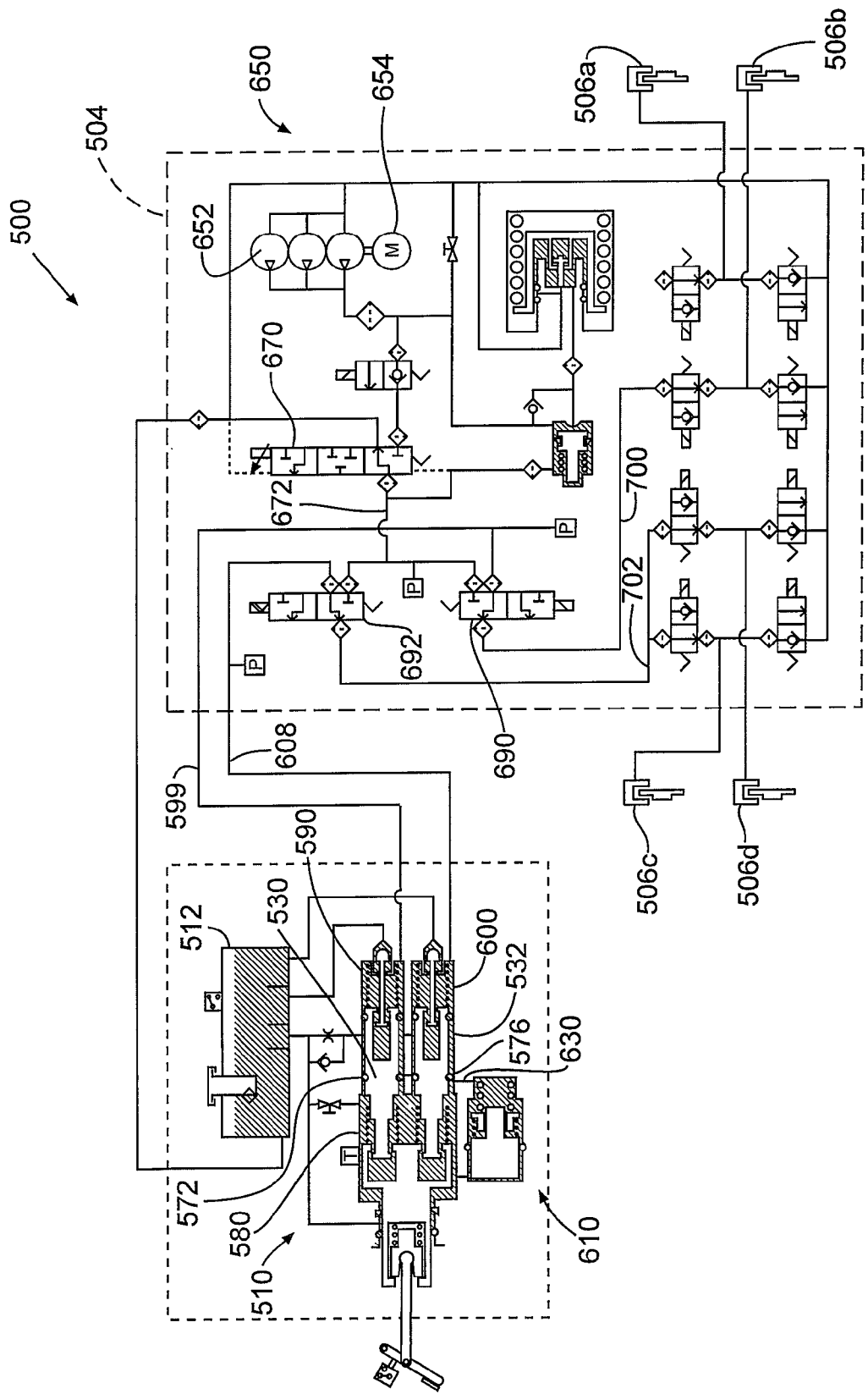
FIG. 11 is a schematic illustration of the brake system of FIG. 8 shown in a failed condition.

FIG. 11 illustrates the brake system 500 when there is a loss of electrical power. In the event of an electrical brake failure, the brake system 500 provides for manual apply or manual push through. During an electrical failure, the motor 654 might cease to operate, thereby failing to produce pressurized hydraulic brake fluid from the pump 652. Furthermore, the boost valve 670 might return to a de-energized position if energized. In this situation, the source of high pressure 650 does not supply pressurized fluid and thus the boost valve 670 does not provide pressurized fluid within the conduit 672. The base brake valves 690 and 692 will shuttle to the positions shown in FIG. 11 closing off fluid flow from the conduit 672 to the conduits 700 and 702. In these positions, the base brake valves 690 and 692 permit fluid flow from the conduits 599 and 608 to the conduits 700 and 702, respectively. Thus, the master cylinder 510 may now provide manual push through for energizing the fluid conduits 700 and 702 for actuation of the wheel brakes 506*a-d*.

During manual push through, the first and second output pistons 530 and 532 will advance rightward pressurizing the chambers 590 and 600. Upon a sufficient distance, the seals 572 and 576 will move past the openings to the conduits 630, thereby preventing fluid flow from reservoir chamber 620 of the pedal simulator from flowing into the reservoir 512. Thus, the seals 572 and 576 may function as a cut off valve. The fluid within the primary chamber 580 is now locked and movement of the primary piston 526 will cause movement of the first and second output pistons 530 and 532.

In another example of a failed condition of the brake system 500, the source of high pressure 650 may fail as discussed about with respect to FIG. 11 and furthermore one of the pressure chambers 590 or 600 may be reduced to zero or reservoir pressure, such as failure of the seal 574 or 578. In this manual push through situation, the pressure within the other non-failed pressure chamber 590 or 600 will be at about twice the pressure if the master cylinder were designed such that each of the sealing areas of the output pistons 630 and 632 (generally at the seal 572 and 576) is equal to half of the sealing area of the primary piston 526 (generally at the seal 552). In this failed condition, the failed output piston 530 or 532 will pull on the primary piston 526 due to the cooperation between the shoulders 560 and 566 and the enlarged heads 556 and 562.

Figure 12:
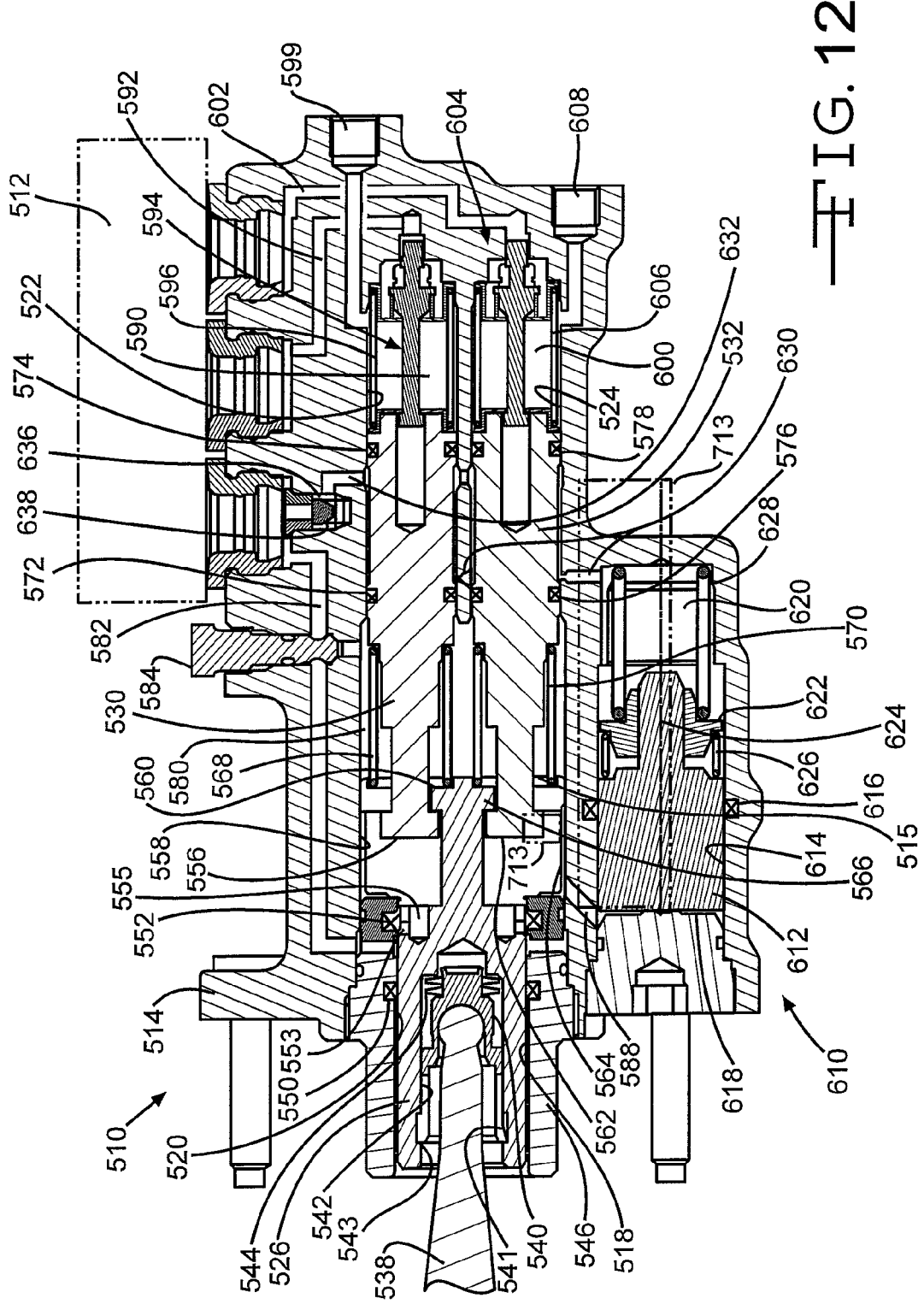
FIG. 12 is a cross-sectional view of an embodiment of the master cylinder assembly of FIG. 9.

There is illustrated in FIG. 12, a detailed cross-sectional view of the master cylinder 510 which may be used with the system 500. The master cylinder assembly illustrated in FIG. 12 is similar in structure and function as the master cylinder 510 shown in FIG. 8 and thus like numbers will be used for components having similar functions although the structures may be different. As stated above, the primary piston 526 includes a slot 558 and a slot 564 (such as an upper and lower slot) for receiving enlarged heads 556 and 562 of the first and second output pistons 530 and 532. Shoulders 560 and 566 retain the enlarged heads 556 and 562. For assembly purposes, the enlarged heads 556 and 562 may be inserted into lateral respective slots 558 and 564. Then the combination of the primary piston 526 and the first and second output pistons 520 and 532 may be inserted into the interior of the housing 514. The primary piston 526 includes a right-hand most end 515 which abuts the springs 568 and 570.

In the illustrated embodiment of FIG. 12, the retainer 540 may be retained in the bore 542 of the primary piston 526 by integral circumferential extending fingers 541 formed on the retainer 540 which snap fit against a shoulder 543 formed in the primary piston 526. The spring 544 may be in the formed of a stack of Belleville washers. The spring 544 preferably has a higher spring rate than the springs 568 and 570 which preferably have a higher spring rate than the springs 596 and 606.

Figure 13:
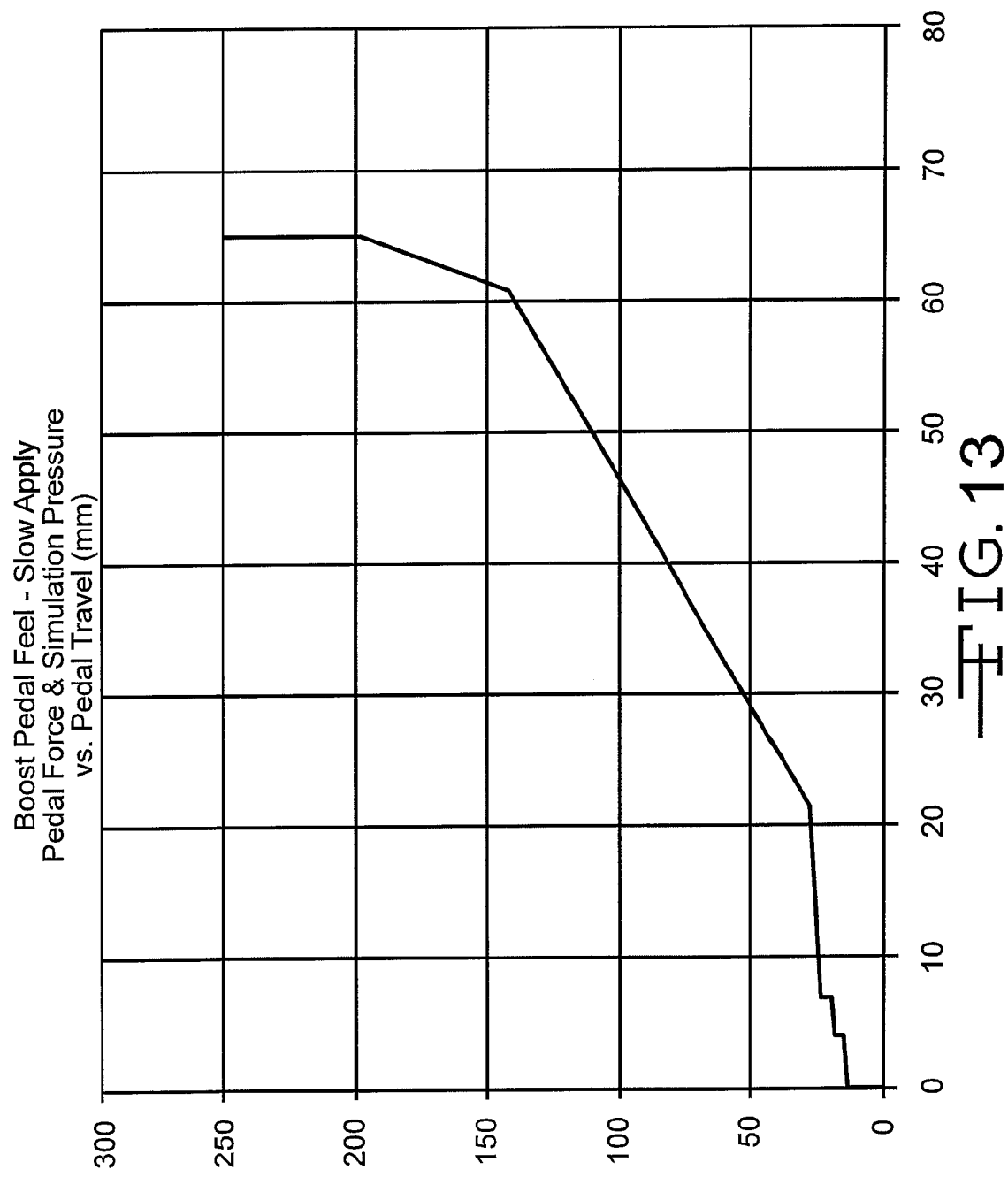
FIG. 13 is a graphical representation of a possible pedal force and simulation pressure vs. pedal travel for the brake system of FIG. 8.
Figure 14:
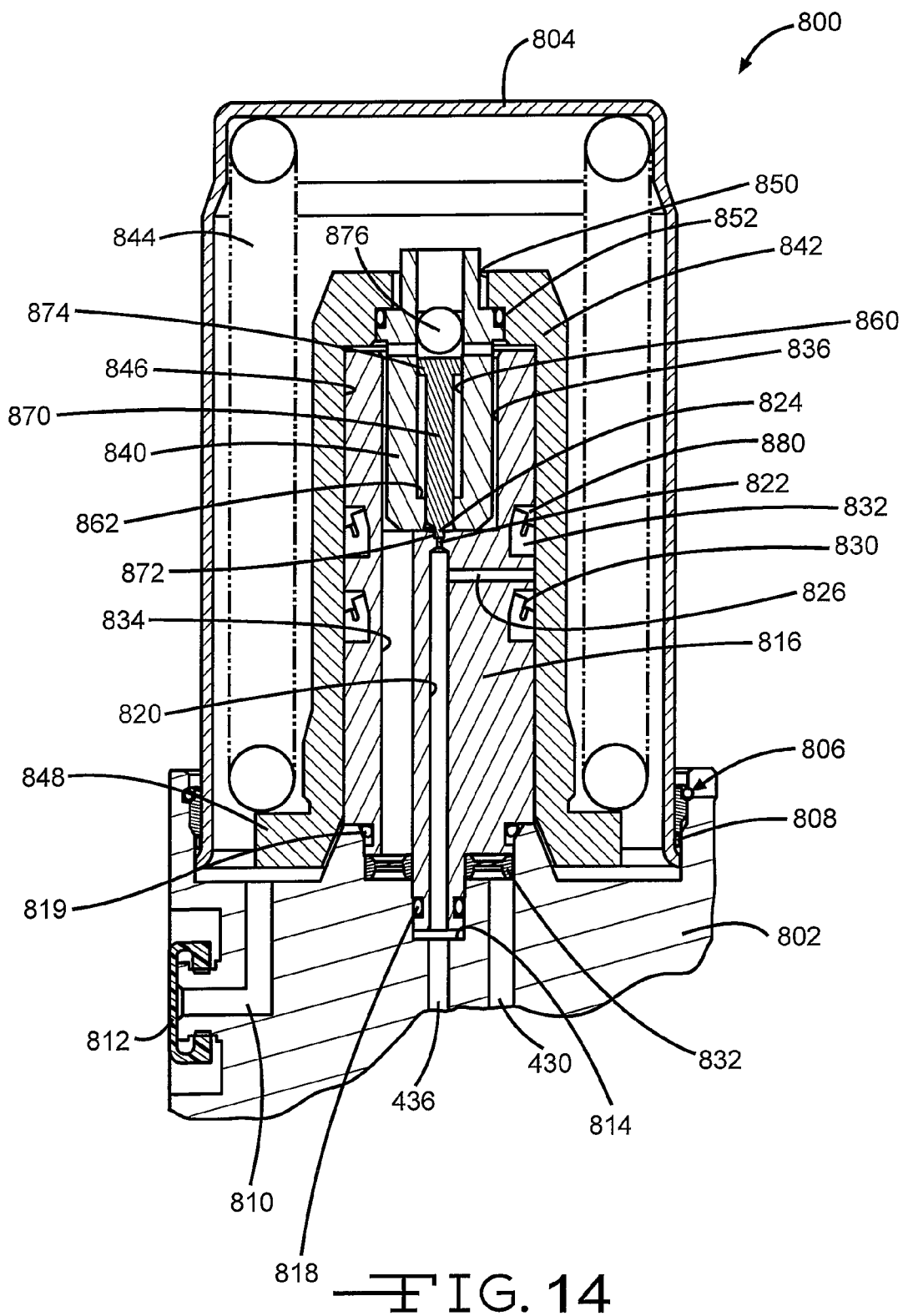
FIG. 14 is a cross-sectional view of an embodiment of a medium pressure accumulator.

FIG. 13 is a graphical representation of a possible pedal force and simulation pressure vs. pedal travel for various brake systems discussed herein, such as the brake system 500. It is noted that at about 4.2 mm of pedal travel there is a change in slope. This change in slope generally corresponds to actuation of the compensation assemblies 594 and 604. A change in slope at about 6.3 mm generally corresponds to the closing of the primary port 533 with seal 552 of the primary piston 526. Another change in slope generally occurs at 24 mm which generally corresponds to the collar 622 contacting the piston 612 of the pedal simulator assembly 610. Another change in slope generally occurs at about 61 mm of travel which generally corresponds to the primary piston 526 contacting the first and second output pistons 530 and 532. The last change in slope at about 65 mm generally coincides with the bottoming out of the There is illustrated in FIG. 14 a cross-sectional view of an embodiment of a MPA 800 (medium pressure accumulator) which may be used in any of the brake systems described above. The MPA 800 is mounted in a housing 802, such as a housing of a hydraulic control unit or power packs described above. A cup-shaped cover 804 surrounds the components of the MPA 800. The cup-shaped cover 804 may be retained on the housing 802 by a circlip assembly 806. An annular seal 808 seals the cover 804 on the housing 802. The housing 802 includes a vent conduit 810 which is covered by a vent cap 812. The vent cap 812 may function as a one way check valve permitting the release of air, fluid or other gases from the interior of the cover 804. The housing 802 further includes a bore 814 which receives an end of a piston 816. The end of the piston 816 is sealingly engaged with the walls of the bore 814 via seals 818 and 819. The piston 816 is generally fixed relative to the housing 802 during operation of the MPA 800.

For description purposes, the MPA 800 will be described as being used as the MPA 424 in the systems 400 of FIG. 6 but it should be understood that the MPA 800 may be used in any suitable brake system such as those described herein. As such, the housing 802 includes a conduit corresponding to the conduit 436 in fluid communication with the reservoir 18. The housing 802 includes another conduit corresponding to the conduit 430 in fluid communication with the priority valve 426. The piston 816 includes a central passageway 820 formed therein in fluid communication with the conduit 436. The central passageway 820 defines an orifice 822 and a seat 824. A lateral passageway 826 is in fluid communication with the central passageway 820 and extends to an outer cylindrical surface of the piston 816 between a pair of lip seals 830 and 832 mounted in grooves formed in the piston 820. The piston 816 further includes a passageway 834 which is in fluid communication with the conduit 830 through an optional annular filter 832. The other end of the piston 816 includes a central bore 836. The seat 824 is between the central bore 836 and the central passageway 820.

The MPA further includes a cage 840, a sleeve 842, and a spring 844. The sleeve 842 has an inverted cup-shape having an inner bore 846 which receives the piston 816. The sleeve 842 is sealingly engaged with the lip seals 830 and 832 and is slidably disposed on the piston 816. The sleeve 842 includes a flange 848. One end of the spring engages the top portion of the cover 804 and the other end of the spring 844 is engaged with flange 848 to bias the sleeve 842, downwardly as viewing FIG. 14. The sleeve 842 includes a stepped through bore 850 which receives an upper portion of the cage 840. The lower portion of the cage 840 is disposed in the central bore 836 of the piston 816. An annular seal 852 is mounted on the upper portion of the cage 840 and engages the walls of the bore 850 of the sleeve 842. The cage 840 includes a stepped through bore 860 defining a shoulder 862. A pin 870 is disposed in the bore 860. One end of the pin 870 includes a valve member 872 in the shape of a spherical end which engages with the seat 824 of the piston 816. The other end of the pin 870 includes an outwardly extending flange 874. The pin 870 may be retained in the bore 860 by a press fit ball 876.

In operation, a pressure chamber 880 defined between the piston 816 and the sleeve 842 expands as the sleeve 842 is moved upward by the entrance of fluid via the conduit 420 and the passageway 834. The cage 840 moves with the sleeve 842. The cage 840 is connected to the sleeve 842 via the frictional engagement of the seal 852. Movement of the sleeve 842 compresses the spring 844, thereby generating a pressure within the chamber 880. The MPA 800 preferably maintains a pressure within a desired range, for example, between 30-80 bar. Alternatively, the MPA 800 may have a different operating pressure range. The MPA 800 includes two bypass functions which vents the chamber 880 to the reservoir when one or more predetermined pressure levels are reached within the chamber 880. The first or main bypass function (valve) occurs when the sleeve 842 is moved sufficiently upward, as viewing FIG. 14, such that the shoulder 862 of the cage 840 abuts the flange 874 of the pin 870 lifting the pin 870. Lifting of the pin 870 causes the valve member 872 to lift from the seat 824 permitting the flow of fluid from the chamber 880 to the central passageway 820 and the conduit 436 which is in fluid communication with the reservoir. This bypass function maintains the chamber 880 at a predetermined pressure level.

The MPA 800 includes an auxiliary bypass function to prevent a pressure build up in the MPA 800 in case the first bypass function fails. For example, if the pin 870 were to break and maintain the valve member 872 against the valve seat 824, an undesirable pressure may build up within the MPA 800. In this situation, the sleeve 842 advances further upward until the end of the cage 840 hits the roof of the cover 804. Further movement causes the cage 840 to dislodge from the sleeve 842 at the seal 852, thereby providing a flow path from the chamber 880 to the interior of the cover 804 where the spring 844 is housed. This fluid can then be vented through the vent 810. This auxiliary bypass function helps prevent the pressure from building up and causing the cover 804 to be dislodged from the housing 802.

Figure 15:
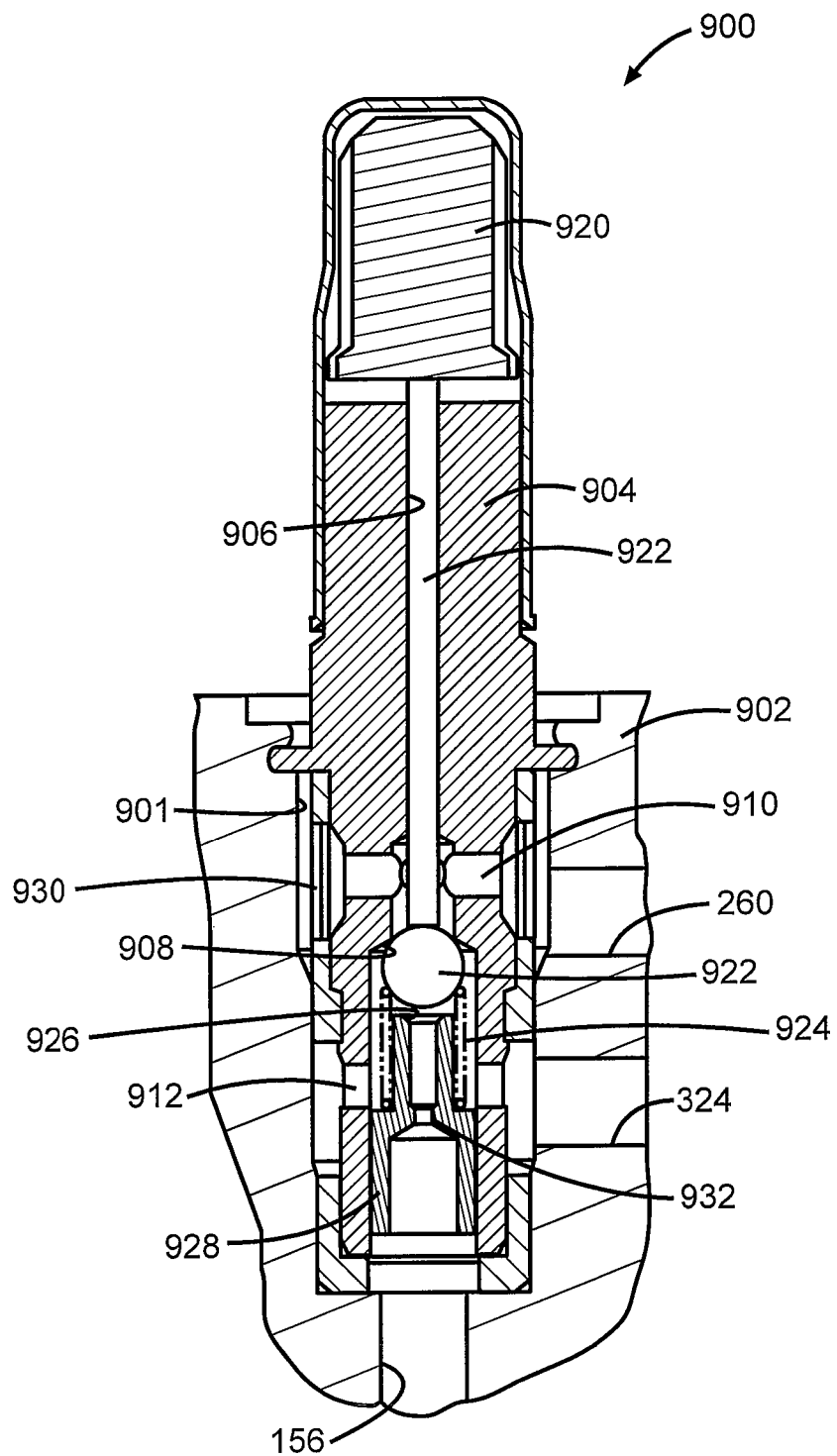
FIG. 15 is a cross-sectional view of an embodiment of a base brake valve.

There is illustrated in FIG. 15 a cross-sectional view of an embodiment of a base brake valve 900 which may be used in any of the brake systems described above. For description purposes, the base brake valve 900 will be described as being used as the base brake valve 900 in the systems 10 of FIG. 1 but it should be understood that the base brake valve 900 may be used in any suitable brake system such as those described herein. The base brake valve 900 is a solenoid actuated three-way valve. The valve 900 is mounted in a bore 901 of a housing 902, such as the block of the hydraulic control unit 12, and is in fluid communication with the conduits 260, 324, and 156. The valve 900 includes a body 904 retained in the housing 902. The body 904 includes a stepped central bore 906 defining a first valve seat 908. The body 904 includes a pair of passageways 910 and 912 extending through the central bore 906 and are in fluid communication with the conduits 260 and 324, respectively. The valve 900 includes an armature 920 that moves downwardly, as viewing FIG. 15, when the valve 900 is energized. Movement of the armature 920 causes a pin 922 to lift a ball 922 from the first valve seat 908. A spring 924 biases the ball 922 against the seat 908. Further movement of the pin 922 will push the ball 922 against a second valve seat 926 of a retainer 928. The retainer 928 includes a through bore in fluid communication with the conduit 156. When the ball 922 is seated on the first valve seat 908, the valve 900 prevents the flow of fluid at the conduit 260 but permits fluid flow between the conduits 156 and 324. When the ball 922 is seated on the second valve seat 926, the valve 900 prevents the flow of fluid at the conduit 156, but permits the flow of fluid between the 260 and 324. The valve 900 can include a combination filer and sealing member 930. The retainer 928 may include a restricted orifice 932 to restrict the flow of fluid therethrough.

Figure 16:
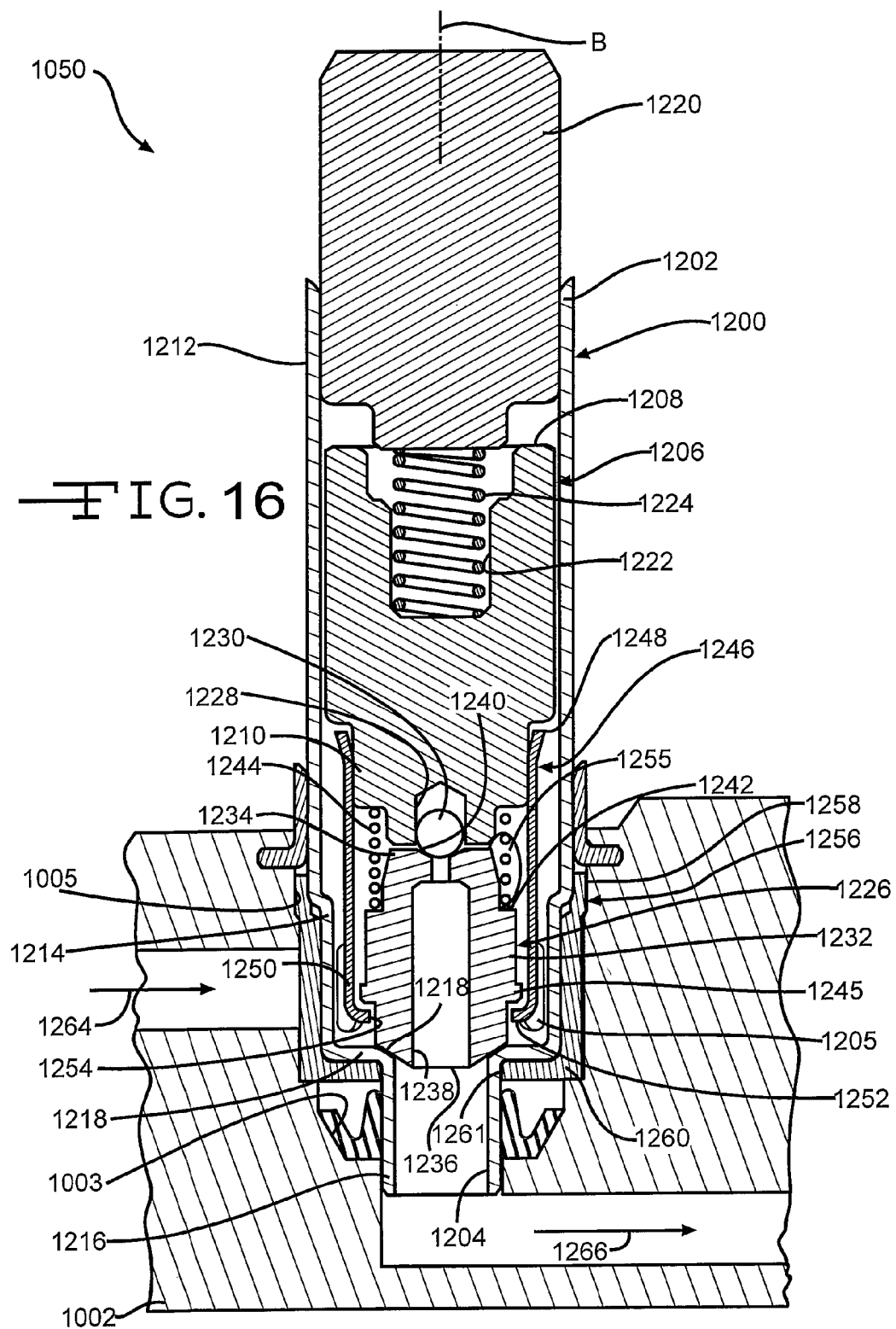
FIG. 16 is a cross-sectional view of an embodiment of a simulation valve.

There is illustrated in FIG. 16 a cross-sectional view of an embodiment of a simulation valve 1050 which may be used in any of the brake systems described above. The simulation valve 1050 is received in a bore 1005 formed in the housing 1002. The simulation valve 1050 includes a sleeve 1200 having a first end 1202 and a second end 1204 and defining an axis B. An armature 1206 has a first end 1208 and a second end 1210 and is slidably received in the sleeve 1200. The simulation valve 1050 further includes a coil assembly (not shown) disposed about the sleeve 1200.

In the illustrated embodiment, the sleeve 1200 is formed as a single piece from ferromagnetic material in a deep drawing process. An example of suitable ferromagnetic material is low-carbon steel. It will be understood however, that low-carbon steel is not required, and that the sleeve 1200 may be formed from any other desired ferromagnetic material.

The sleeve 1200 includes a first body portion 1212 having a first diameter, a second body portion 1214 having a second diameter, and a third body portion 1216 having a third diameter. The second end 1204 of the sleeve 1200 includes a radially inwardly extending first shoulder 1218 extending between the second body portion 1214 and the third body portion 1216, and defining a valve seat 1218. A magnetic core 1220 is attached to the first end of the sleeve 1200, thereby closing the first end. 1202 of the sleeve 1200. The core 1220 may be attached to the first end 1202 of the sleeve 1200 by any suitable means, such as with a single laser weld. Alternatively, the core 1220 may be attached to the first end 1202 of the sleeve 1200 by any other desired method. A plurality of fluid passages 1205 are formed in the sleeve 1200.

The armature 1206 is slidably received in the sleeve 1200. In the exemplary embodiment illustrated, the first end 1208 of the armature 1206 includes a spring cavity 1222. The first spring 1224 is disposed in the cavity 1222 and engages the armature 1206 and the core 1220 to urge the armature 1206 and the poppet 1226 (described in detail below) toward the valve seat 1218 when the simulation valve 1050 is in the closed position. When the coil assembly is energized, the armature 1206 and the poppet 1226 are disposed at an extreme of travel away from the valve seat 1218, such that the simulation valve 1050 is in an open position (not shown).

A recess 1228 is formed in an end surface of the second end 1210 of the armature 1206. A spherical valve part or ball 1230 is pressed into the recess 1228. In the illustrated embodiment, the ball 1230 is formed from steel. Alternatively, the ball 1230 may be formed from any other substantially non-deformable metal or non-metal. In the illustrated embodiment, the armature 1206 is formed from ferromagnetic material in a cold forming process. An example of suitable ferromagnetic material is low-carbon steel. It will be understood however, that low-carbon steel is not required, and that the armature 1206 may be formed from any other desired ferromagnetic material.

The poppet 1226 is disposed between the armature 1206 and the valve seat 1218 and includes a generally cylindrical body 1232 having a first end 1234, a second end 1236, and a bore 1238 therethrough. The first end 1234 defines a seat portion 1240. A radially outwardly extending circumferential shoulder 1242 is defined in an outer surface of the poppet 1226 intermediate the first end 1234 and the second end 1236. A second spring 1244 extends between the second end 1210 of the armature 1206 and the shoulder 1242. A radially outwardly extending circumferential flange 1245 is also formed in an outer surface of the poppet 1226.

In the illustrated embodiment, the poppet 1226 is formed as a single piece from plastic material. An example of suitable plastic material is nylon. It will be understood however, that nylon is not required, and that the poppet 1226 may be formed from any other desired material.

A substantially cup-shaped cage 1246 includes a first end 1248 and a second end 1250. The second end 1250 of the cage 1246 includes a radially inwardly extending shoulder 1252 defining a cage opening 1254. A plurality of fluid passages 1255 are formed in the cage 1246. In the illustrated embodiment, the cage 1246 is formed as a single piece from ferromagnetic material in a deep drawing process. An example of suitable ferromagnetic material is low-carbon steel. It will be understood however, that low-carbon steel is not required, and that the cage 1246 may be formed from any other desired ferromagnetic material.

The flange 1245 of the poppet 1226 is slidably received within the cage 1246. The second end 1236 of the poppet 1226 extends through the opening 1254 of the cage 1246 arid further sealingly engages the valve seat 1 218.

An electrical coil (not shown) is disposed about the sleeve 1200, armature 1206, and magnetic core 1220 and selectively induces a magnetic flux in the armature 1206. Because the simulation valve 1050 is a normally closed valve, the first spring 1224 urges the armature 1206 and the poppet 1226 into contact with the valve seat 1218 when the coil assembly of the simulation valve 1050 is not energized, thereby blocking fluid flow through the simulation valve 1050. When the coil assembly is energized, the armature 1206 and the poppet are urged away from the valve seat 218 to permit fluid flow through the simulation valve 1050.

A circumferentially extending internal band filter 1256 includes a first end 1258 and a second end 1260 and may be placed about the second body portion 1214 of the sleeve 1200. In the illustrated embodiment, the second end 1260 includes an opening 1261 through which the third body portion 1216 extends. The second end 1260 of the filter 1256 further engages the first shoulder 1218. It will be understood however, that such a band filter 1256 is not required. A lip seal 1262 is disposed about the third body portion 1216 of the poppet 1226 between the filter 1256 and the second end 1236 of the poppet 1226.

The ball 1230 acts as a valve sealing element and engages the seat portion 1240 of the poppet 1226 when the valve 1050 is in the closed position (e.g. when the coil assembly is not energized).

If a pressure difference between the inlet side (see the arrow 1264) and the outlet side (see the arrow 1266) of the housing 1002 is relatively small, and if the closing force acting on the poppet 1226 is lower than the force exerted by the second spring 1244, then the valve seat 1218 is opened without movement of the poppet 1226 relative to the armature 1206.

When the pressure difference between the inlet side and the outlet side 1266 of the housing 1002 is relatively large, then the hydraulic closing force acting on the poppet 1226 may be greater than the force exerted by the second spring 1244.

The magnetic force, which is low at the beginning of the armature 1206 stroke (upward as viewed in FIG. 16), will, upon movement of the armature 1206 toward the core 1220, overcome the pre-stressing force of the first spring 1224 and the second spring 1244 as well as the hydraulic closing force acting on the armature 1206, in order to open the poppet 1226 (by moving the ball 1230 of the armature 1206 away from the seat portion 1240 of the poppet 1226).

Opening the seat portion 1240 of the poppet 1226 over the course of armature 1206 movement, fluid may flow through the bore 1238 of the poppet 1226 to the outlet side 266. As a result of the opening of the seat portion 1240, the pressure difference is reduced and the closing force acting upon the poppet 1226 is reduced.

Figure 17:
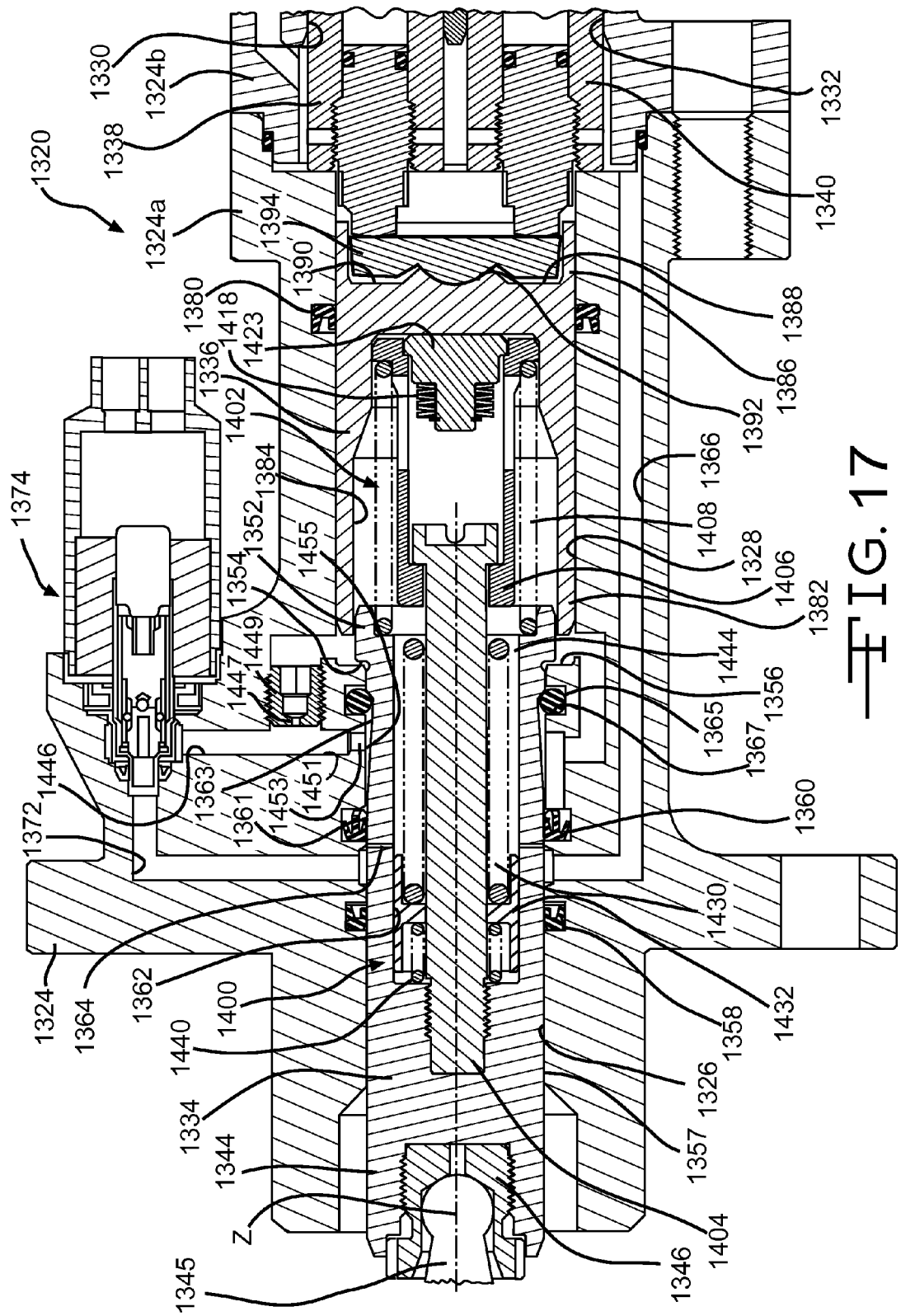
FIG. 17 is an enlarged schematic sectional view of a portion of an alternate embodiment of a brake pedal unit shown in its rest position.

There is illustrated in FIG. 17 a portion of an alternate embodiment of a brake pedal unit (BPU), indicated generally at 1320. The brake pedal unit 1320 is similar in structure and function as the brake pedal unit 20 illustrated in FIGS. 2-4. Differences between the brake pedal units 20 and 1320 will be described below. The brake pedal unit 1320 may be connected to a reservoir, such as the reservoir 18. Although the portion of the brake pedal unit 1320 which is connected to the reservoir 18 is not illustrated in FIG. 17, it should be understood that the structure and function of that portion (right-hand end as viewing FIG. 17) may be formed similarly as the brake pedal unit 20 illustrated in FIGS. 2-4.

The brake pedal unit 1320 includes a housing 1324 having various bores formed therein for slidably receiving various cylindrical pistons and other components therein. In the embodiment illustrated in FIG. 17, the housing 1324 is formed from a first portion 1324a and a second portion 1324b. The first and second portions 1324a and 1324b may be coupled together by any suitable manner, such as by mounting bolts. The housing 1324 generally includes a first bore 1326, a second bore 1328, a third bore 1330, and a fourth bore 1332. The first and second bores 1326 and 1328 are formed in the first portion 1324a of the housing 1324 and are axially aligned with one another. The second bore 1328 has a larger diameter than the first bore 1326. The third and fourth bores 1330 and 1332 are formed in the second portion 1324b and are in communication with the larger diameter second bore 1328. The third bore 1330 is located laterally (or above when viewing FIG. 17) with respect to the fourth bore 1332.

The brake pedal unit 1320 further includes an input piston 1334, an intermediate piston 1336, a first output piston 1338, and a second output piston 1340. The input piston 1334 is slidably disposed in the first bore 1326. The intermediate piston 1336 is slidably disposed in the second bore 1328. The first output piston 1338 is slidably disposed in the third bore 1330. The second output piston 1340 is slidably disposed in the fourth bore 1332. Although not shown in their entirety in FIG. 17, the first and second output pistons 1338 and 1340 may have the same structure as the output pistons 38 and 40 of the brake pedal unit 20 and may function in a similar manner.

Figure 18:
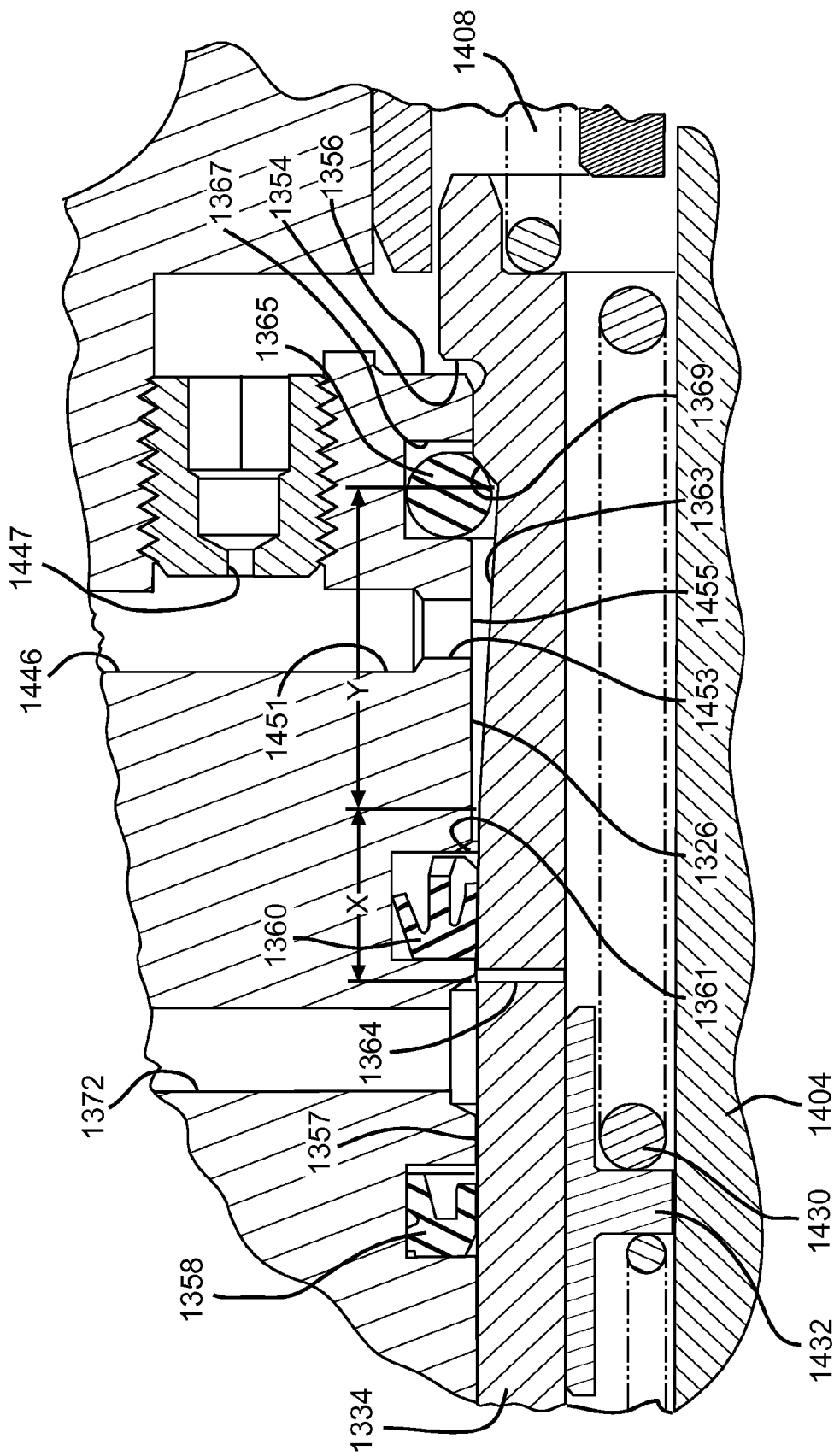
FIG. 18 is an enlarged cross-sectional view of a portion of the brake pedal unit of FIG. 17 illustrating the sloped frusto-conical surfaces on an input piston.

A brake pedal (not shown) is coupled to a first end 1344 of the input piston 1334 via an input rod 1345 and a coupler 1346. The coupler 1346 is threadably engaged with the first end 1344 of the input piston 1334 and can include a socket for receiving a spherical end of the input rod 1344. The input piston 1334 includes an enlarged second end 1352 that defines a shoulder 1354. In the rest position shown in FIG. 17, the shoulder 1354 of the input piston is spaced slightly away from a shoulder 1356 formed between the first and second bores 1326 and 1328 of the housing 1324. An outer surface 1357 of the input piston 1334 is engaged with lip seals 1358 and 1360 mounted in grooves formed in the housing 1324. One of the differences between the brake pedal units 20 and 1320 is that the input piston 1334 of the brake pedal unit 1320 includes first and second frustoconical surfaces 1361 and 1363. As best shown in FIG. 18, the first frustoconical surface 1361 extends along a length X of the input piston 1334. The second frustoconical surface 1363 extends along a length Y of the input piston 1334. For reasons which will be discussed below, the first and second frustoconical surfaces 1361 and 1363 are angled or sloped relative to a central axis Z defined along the length of the input piston 1334. During operation of the brake pedal unit 1320, the input piston 1334 moves along the axis Z. Movement of the input piston 1334 causes the first and second frustoconical surfaces 1361 and 1363 to slide along an elastomeric seal 1365. The seal 1365 is housed in a groove 1367 formed in a wall of the first bore 1326. For reasons which will be discussed further below, the seal 1365 is expanded outwardly as the input piston 1334 moves in a rightward direction, as viewing FIGS. 17 and 18, due to the inclined first and second frustoconical surfaces 1361 and 1363.

As shown in FIGS. 17 and 18, the input piston 1334 includes an angled shoulder 1369 located at the right-hand end of the second frustoconical surface 1363 and connects with the outer cylindrical surface 1357. When the brake pedal unit 1320 is in a "rest" position (i.e., the pedal has not been depressed by the driver of the vehicle), the shoulder 1369 abuts the seal 1365 and prevents further leftward movement of the input piston 1334. Unlike the brake pedal unit 20, the brake pedal unit 1320 is configured such that the abutment of the seat 1365 and the angled shoulder 1369 provides a gap between the shoulder 1354 of the input piston 1334 and the shoulder 1356 of the housing 1324. Thus, during release of the brake pedal by the driver, the input piston 1334 will be cushioned to its rest position by the abutment of the elastomeric seal 1365 and the angled shoulder 1369 as compared to a metal to metal contact of the brake pedal unit 20. Thus, the elastomeric seal 1365 functions as a deformable cushion or stop to dampen travel of the input piston 1334 to its rest position. The seal 1365 may also help avoid a severe step or increase in force to start movement of the brake pedal by the driver. Of course, the shoulder 1354 will still provide a stop for leftward movement of the input piston 1334 such as in cases of failure of the seal 1365. Although the seal 1365 is shown in the form of an O-ring having a generally circular cross-sectional shape, it should be understood that the seal 1365 can have any suitable shape. For example, the seal 1365 could be a quad ring-type seal. It should also be understood that the shoulder 1369 need not be angled as shown in FIGS. 17 and 18, but could have any suitable shape to permit the desired abutment and cushioning properties in cooperation with a suitably shaped seal 1365.

The input piston 34 includes a central bore 1362 formed through the second end 52. One or more lateral passageways 1364 are formed through the input piston 1334. The lateral passageways 1364 extend from the central bore 1362 to the outer surface 1357 of the input piston 1334. As shown in FIG. 18, the lateral passageways 1364 may pass through the first frustoconical surface 1361. In one embodiment, the input piston 1334 includes four lateral passageways 1364 spaced 90 degrees about the circumference of the input piston 1334.

The brake pedal unit 1320 is in the rest position as shown in FIGS. 17 and 18. In the rest position, the passageways 1364 of the input piston 1334 are between the lip seals 1358 and 1360. In this position, the passageways 1364 are in fluid communication with a conduit 1366 formed through the first portion 1324a of the housing 1324. The conduit 1366 is in fluid communication with the reservoir in a similar manner as the brake pedal unit 20. In the rest position, the passageways 1364 are also in fluid communication with a conduit 1372 formed in the housing 1324 which leads to a cut off valve or simulation valve 1374. The simulation valve 1374 may be electrically operated. The simulation valve 1374 may be operated in a similar manner as the simulation valve 74 described above.

The intermediate piston 1336 is slidably disposed in the second bore 1328 of the housing 1324. The outer wall of the intermediate piston 1336 is engaged with a lip seal 1380 mounted in a groove formed in the housing 1324. The intermediate piston 1336 includes a first end 1382 having a cavity 1384 formed therein. A second end 1386 of the intermediate piston 1336 includes a cavity 1388 formed therein. The cavity 1388 includes a floor 1390 defining a pivot groove 1392 which functions as a "rocker-like" or "cam-like" support surface for a wobble plate 1394.

The central bore 1362 of the input piston 1334 and the cavity 1384 of the intermediate piston 1336 house various components defining a pedal simulator, indicated generally at 1400. The pedal simulator 1400 may be similar in structure and function as the pedal simulator 100 of the brake pedal unit 20. The pedal simulator includes a caged spring assembly, indicated generally at 1402, and is defined by a pin 1404, a retainer 1406, and a low rate simulator spring 1408. A stop 1423 is provided which may be integrally formed with the retainer 1420 or may be a separate piece attached thereto. The stop 1423 is axially aligned with the pin 1404. The stop 1423 includes a plurality of disc springs 1418 (also known as Belleville washers, coned-disc springs, or cupped spring washers) which may be in a preloaded state or may mounted in a non-loaded state.

The pedal simulator 1400 further includes a high rate simulator spring 1430 which is disposed about the pin 1404. The terms low rate and high rate are used for description purposes and are not intended to be limiting. It should be understood that that the various springs of the pedal simulator 1400 may have any suitable spring coefficient or spring rate. In the illustrated embodiment, the high rate simulator spring 1430 preferably has a higher spring rate than the low rate simulator spring 1408. A sleeve 1432 is slidably disposed in the central bore 1362 of the input piston 1334 and includes a through bore through which the pin 1404 extends. One end of the high rate simulator spring 1430 engages with the sleeve 1432. The other end of the high rate simulator spring 1430 is shown in FIG. 17 in a non-engaged position and spaced away from an end of the retainer 1406. A blend spring 1440 is disposed about the pin 1404. One end of the blend spring 1440 engages with the sleeve 1432, and the other end of the blend spring 1440 engages with a bottom floor portion of the central bore 1362 of the input piston 1334. The housing 1324, the input piston 1334 (and its seals), and the intermediate piston 1336 (and its seals) generally define a simulation chamber 1444. The simulation chamber 1444 is in fluid communication with a conduit 1446 which is in fluid communication with the simulation valve 1374. The conduit 1446 includes a reduced diameter fixed orifice 1447 therein. In the embodiment shown in FIG. 17, the fixed orifice 1447 is formed in a plug 1449 that is threaded or otherwise mounted in the housing 1324. The fixed orifice 1447, or a plurality of fixed orifices, may be formed in the conduit 1446 by any suitable manner. The fixed orifice 1447 may be located vertically above the simulation chamber 1444 to provide for ease of bleeding fluid to the simulation chamber 1444. An auxiliary conduit 1451 is in fluid communication between the conduit 1446 and to the simulation chamber 1444. The auxiliary conduit 1451 ports into the first bore 1326 at an orifice 1453. In the embodiment shown, the orifice 1453 is larger in cross-sectional area compared to the fixed orifice 1447. It should be understood that the orifices 1447 and 1453 may be sized to any suitable cross-sectional area. As will be discussed below, the flow rate through the orifice 1453 also depends on the location of the input piston 1334 due to the first and second frustoconical surfaces 1361 and 1363 in proximity to the opening of the orifice 1453 at the wall of the first bore 1326.

The operation of the brake pedal unit 1320 will now be described. As stated above, the brake pedal unit 1320 may operate in a similar manner as the brake pedal unit 20 of FIGS. 2-4 and will be described as being used in cooperation with the brake system 10 of FIG. 1. Differences in the operation between the brake pedal units 1320 and 20 will be discussed below. Similar functions and operations may not necessarily be duplicated in this discussion of the operation of the brake pedal unit 1320. FIGS. 17 and 18 illustrate the brake pedal unit 1320 in its rest position. In this condition, the driver is not depressing the brake pedal 42. Also in the condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). During a normal boost apply braking operation, the flow of pressurized fluid from the brake pedal unit 1320 generated by depression of the brake pedal 42 is diverted into the pedal simulator assembly 1400. The simulation valve 1374 is actuated to divert fluid through the simulation valve 1374 from the simulation chamber 1444 to the reservoir. Note that fluid flow from the simulation chamber 1444 to the reservoir 18 is closed off once the passageways 1364 move past the seal 1360. Prior to movement of the input piston 1334, as shown in FIG. 17, the simulation chamber 1444 is in fluid communication with the reservoir 18. Movement of the input rod 1345 by the pedal 42 causes movement of the input piston 1334 in a rightward direction, as viewing FIGS. 17 and 18. Initial movement of the input piston 34 causes movement of the intermediate piston 36 via the low rate simulator spring 108 and will close the center valve assemblies associated with the first and second output pistons 1338 and 1340, thereby preventing further movement of the pistons 1338 and 1340. As the input piston 1334 continues to move rightward, as viewing FIGS. 17 and 18, the various springs of the pedal simulator assembly 1400 are compressed, thereby providing a feedback force to the driver of the vehicle.

During rightward movement of the input piston 1334 relative to a generally stationary intermediate piston 1336, such as during a normal braking operation in which the simulation chamber 1444 is not hydraulically locked, the seal 1365 is moved radially outwardly into the groove 1367. During this rightward movement of the input piston 1334, radially outwardly extending forces are acting on the seal 1365 causing it to be expanded or stretched yet confined in the groove 1367. This deformation and expansion results in an increase in frictional forces during movement of the input piston 1334 caused by the reactionary compressive forces of the seal 1365 acting against the frustoconical surfaces 1361 and 1363. Due to the frustoconical shape of the surfaces 1361 and 1363 of the input piston 1334, the frictional forces increase as the input piston 1334 moves rightwardly as viewing FIGS. 17 and 18. Thus, as the input piston 1334 is advanced in a rightward direction as viewing FIGS. 17 and 18, the rate of friction is progressive or increases the farther the input piston is advanced. The cross-sectional profile or slopes of the frustoconical surfaces 1361 and 1363 can be configured or shaped to provide a desired progressive hysteresis such that there is increased friction with an increase in travel of the input piston 1334. For example, the angle or slope of the frustoconical surfaces 1361 and 1363 may be configured to mimic the "pedal feel" of a conventional vacuum boosted system. Although the embodiment of the input piston 1334 has two frustoconical surfaces of different slope angles, the profile of the input piston 1334 can be formed into any suitable shape to provide a desired feedback force. For example, the frustoconical surfaces 1361 and 1363 need not be linear (in a cross-sectional profile), as shown in FIGS. 17 and 18, but can have a curvilinear shape. However, a curvilinear frustoconical shape may be more difficult and expensive to manufacture so a single or multiple linear sloped frustoconical surface may be sufficient to achieve a desired force profile. In the illustrated embodiment, this is accomplished by having two linear slopes wherein the first frustoconical surface 1361 is slightly angled or sloped relative to the outer cylindrical surface 1357 and the second frustoconical surface 1363 has a greater angle of slope than the first frustoconical surface 1361.

If desired, the brake pedal unit 1320 may be configured to provide for an initial movement of the input piston 1334 such that the seal 1365 does not engage yet with the second frustoconical surface 1363. The configuration and size of the seal 1365, the groove 1367, the second frustoconical surface 1363, and the angled shoulder 1369 may be designed to permit a 2 mm amount of travel, for example, prior to engagement between the seal 1365 and the second frustoconical surface 1363. The configuration may be made, for example, to mimic the reactionary forces or pedal feel of a conventional vacuum assisted brake system.

The brake pedal unit 1320 also provides a damping effect during a normal boosted brake operation. For example, in a spike apply in which the driver presses on the brake pedal 42 in a rapid and forceful manner, the fixed orifice 1447 restricts the flow of fluid between the simulation chamber 1444 and the reservoir via the conduit 1446, thereby impeding advancement of the input piston 1334. Additionally, the orifice 1453 provides additional or secondary damping as fluid flows between the simulation chamber 1444 and the reservoir. However, this additional or secondary damping provides progressive damping in that the amount of damping is increased with an increase in pedal travel because a port or opening 1455 of the orifice 1453 to the first bore 1326 is being choked off by the sloping sides of the frustoconical surfaces 1361 and 1363. As the input piston 1334 continues to move rightward as viewing FIGS. 17 and 18, the frustoconical surfaces 1361 and 1363 become closer to the opening 1455 of the orifice 1453, thereby further restricting the flow of fluid therethrough. The sizes and dimensions of the orifice 1453 and the frustoconical surfaces 1361 and 1363 may be tuned or configured to provide a desired progressive damping profile.

Another difference between the brake pedal units 20 and 1320 is that the brake pedal unit 1320 does not include a check valve assembly 320 as in the brake pedal unit 20 of FIGS. 2-4. The check valve assembly 320 provided a bypass from the reservoir to the simulation valve 74. The check valve assembly 320 may be eliminated since the spacing between the second frustoconical surface 1363 and the orifice 1453 is relatively large during the initial stages of movement of the input piston 1334.

Although the term "seal" is used for the O-ring type structure identified by reference number 1365, it should be understood that the seal 1365 need not have to provide sealing properties for structures within the brake pedal unit 1320. For example, the seal 1365 could be configured as a different elastomeric or spring like device located in a different portion of the brake pedal unit 1320 while still providing progressive force and/or damping properties during travel of the input piston 1334.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pedal simulator assembly comprising:
   a housing having a bore;
   an input piston slideably mounted within said bore for reciprocating movement therein;
   a spring exerting a force on said input piston to provide a feedback force when said piston travels in a first direction; and
   a member slidably engageable with a contact surface during movement of said input piston, wherein sliding engagement between said member and said contact surface provides a progressive rate of friction between said contact surface and said member as said input piston advances in said first direction.

2. The assembly of claim 1, wherein said member is compressed as said input piston travels in said first direction.

3. The assembly of claim 1, wherein said member is a seal.

4. The assembly of claim 3, wherein said seal is made of an elastomeric material.

5. The assembly of claim 4, wherein said seal is in the form of an O-ring disposed about an outer surface of said input piston defining said contact surface.

6. The assembly of claim 5, wherein said O-ring has a generally circular cross-section.

7. The assembly of claim 3, wherein said seal slides along a frustoconical surface formed in said input piston as said input piston travels in said first direction, wherein said frustoconical surface defines said contact surface.

8. The assembly of claim 7, wherein said seal is disposed about said frustoconical surface of said input piston, and wherein said seal is forced to expand in a radially outwardly direction as said frustoconical surface slides along said seal as said input piston travels in said first direction.

9. The assembly of claim 7, wherein said input piston includes a second frustoconical surface formed in said input piston having a different slope than said frustoconical surface, and wherein said second frustoconical surface slides along said seal subsequently to sliding along the frustoconical surface when said input piston travels in said first direction.

10. The assembly of claim 1, wherein said member cushions said input piston into a rest position when said input piston travels in a return direction opposite said first direction.

11. The assembly of claim 1 incorporated into a vehicle brake system including:
    a vehicle brake pedal coupled to said input piston for operating said pedal simulator assembly during a normal braking mode;
    a brake pedal unit having a pair of output pistons operable to generate brake actuating pressure at first and second outputs of said brake pedal unit during a manual push through mode;
    a hydraulic pressure source for supplying fluid at a controlled boost pressure; and
    a hydraulic control unit adapted to be hydraulically connected to said brake pedal unit and said hydraulic pressure source, said hydraulic control unit including:
        a slip control valve arrangement; and
        a switching base brake valve arrangement for switching said brake assembly between the normal braking mode wherein boost pressure from said pressure source is supplied to first and second vehicle brakes, and the manual push through mode wherein brake actuating pressure from said brake pedal unit is supplied to said first and second vehicle brakes.

12. The assembly of claim 1, wherein said contact surface is defined as a surface of said input piston.

13. A pedal simulator assembly comprising:
    a housing having a bore;
    an input piston slideably mounted within said bore for reciprocating movement therein; and
    a spring exerting a force on said input piston to provide a feedback force when said piston travels in a first direction,
    wherein said input piston and said bore define a fluid chamber in communication with a fluid reservoir via a conduit, and wherein an orifice is disposed in said conduit to restrict the flow of fluid therethrough such that said orifice cooperates with said input piston to provide progressive damping to impede the advancement of said input piston as said input piston travels in said first direction.

14. The assembly of claim 13, wherein said orifice is defined as a port connecting said bore to said conduit, and wherein said input piston includes a frustoconical surface located adjacent said port such that as said input piston advances in said first direction said frustoconical surface becomes closer to said port, thereby further restricting flow of fluid through said orifice.

15. The assembly of claim 14, wherein said frustoconical surface has a linear shape in a cross-sectional profile.

16. The assembly of claim 14, wherein said input piston includes a second frustoconical surface formed in said input piston having a different slope than the frustoconical surface, and wherein said second frustoconical surface slides past the port subsequently to said frustoconical surface sliding past said port when said input piston moves in said first direction.

17. The assembly of claim 16, wherein said second frustoconical surface has a linear shape in a cross-sectional profile.

18. The assembly of claim 13 incorporated into a vehicle brake system including:
    a vehicle brake pedal coupled to said input piston for operating said pedal simulator assembly during a normal braking mode;
    a brake pedal unit having a pair of output pistons operable to generate brake actuating pressure at first and second outputs of said brake pedal unit during a manual push through mode;
    a hydraulic pressure source for supplying fluid at a controlled boost pressure; and
    a hydraulic control unit adapted to be hydraulically connected to said brake pedal unit and said hydraulic pressure source, said hydraulic control unit including:
        a slip control valve arrangement; and
        a switching base brake valve arrangement for switching said brake system between the normal braking mode wherein boost pressure from said pressure source is supplied to first and second vehicle brakes, and the manual push through mode wherein brake actuating pressure from said brake pedal unit is supplied to said first and second vehicle brakes.

19. The assembly of claim 18 further including a cut off valve which is actuated upon a brake pedal application to permit fluid flow through said conduit during a normal braking mode and, in a manual push through mode, prevents fluid flow through the conduit to couple axial movement of said input piston to the output pistons.

* * * * *